US012695633B2

(12) United States Patent
Li et al.

(10) Patent No.: US 12,695,633 B2
(45) Date of Patent: Jul. 28, 2026

(54) SYSTEMS AND METHODS FOR SUPPORTING NETWORK-BASED COMPUTING SERVICES

(71) Applicant: HUAWEI TECHNOLOGIES CO., LTD., Shenzhen (CN)

(72) Inventors: Xu Li, Kanata (CA); Hang Zhang, Kanata (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 224 days.

(21) Appl. No.: 18/531,845

(22) Filed: Dec. 7, 2023

(65) Prior Publication Data

US 2024/0113899 A1      Apr. 4, 2024

Related U.S. Application Data

(63) Continuation of application No. PCT/CN2021/098733, filed on Jun. 7, 2021.

(51) Int. Cl.
*H04L 9/40* (2022.01)
*G06F 21/57* (2013.01)

(52) U.S. Cl.
CPC .............. *H04L 9/40* (2022.05); *G06F 21/577* (2013.01)

(58) Field of Classification Search
CPC .................................. H04L 9/40; G06F 21/577

(Continued)

(56) References Cited

U.S. PATENT DOCUMENTS

| | | | |
|---|---|---|---|
| 7,079,655 B1 | 7/2006 | Tochikubo et al. | |
| 7,801,171 B2 * | 9/2010 | Skoczkowski .... | H04M 15/7655 |
| | | | 455/410 |

(Continued)

FOREIGN PATENT DOCUMENTS

| | | |
|---|---|---|
| CN | 110070300 A | 7/2019 |
| CN | 110490738 A | 11/2019 |

(Continued)

OTHER PUBLICATIONS

Xiaoyu Zhang: "DeepPAR and DeepDPA: Privacy Preserving and Asynchronous Deep Learning for Industrial IOT", IEEE Transactions on Industrial Informatics, vol. 16, No. 3, Mar. 1, 2020 (Mar. 1, 2020), pp. 2081-2090, XP093152140.

(Continued)

*Primary Examiner* — Khanh Q Dinh

(57) ABSTRACT

A method of implementing a computing service on edge nodes of a communication network, where the computing service is made from a plurality of service functions, each of which is connected to another service function by a communication routine. Service functions and routines can be deployed on edge nodes and communication between any two service functions can be performed via a routine and a privacy router, with coordination from a routine manager. Service functions and routines can be grouped into tasks, which can be coordinated with task managers. Tasks can be grouped into works, which can be coordinated with work managers. Because a privacy router can perform encryption on routine communications, any of the entities implementing the computing service can be deployed on edge nodes of a communication network, and a service manager can interface with external entities.

18 Claims, 11 Drawing Sheets

(58) Field of Classification Search

USPC .......................................... 709/220, 224–228

See application file for complete search history.

(56) References Cited

U.S. PATENT DOCUMENTS

| | | | | |
|---|---|---|---|---|
| 7,823,190 | B1 * | 10/2010 | Kacarov | H04L 9/3226 |
| | | | | 380/278 |
| 8,869,270 | B2 * | 10/2014 | Touboul | G06F 21/57 |
| | | | | 726/13 |
| 8,997,197 | B2 * | 3/2015 | Nord | G06F 9/00 |
| | | | | 713/171 |
| 9,805,210 | B2 * | 10/2017 | Nord | G06F 16/00 |
| 10,686,646 | B1 * | 6/2020 | Suryanarayanan | H04L 67/131 |
| 11,151,284 | B2 | 10/2021 | Haletky | |
| 11,775,586 | B2 * | 10/2023 | Chen | G06F 9/485 |
| | | | | 707/769 |
| 2007/0237332 | A1 | 10/2007 | Lyle | |
| 2007/0256120 | A1 | 11/2007 | Shatzkamer et al. | |
| 2009/0228708 | A1 | 9/2009 | Trostle | |
| 2011/0107411 | A1 * | 5/2011 | McClain | H04L 63/102 |
| | | | | 726/9 |
| 2013/0014225 | A1 | 1/2013 | Kageyama | |
| 2014/0052642 | A1 | 2/2014 | Spies et al. | |
| 2014/0164774 | A1 * | 6/2014 | Nord | H04L 9/0861 |
| | | | | 713/171 |
| 2015/0169892 | A1 * | 6/2015 | Nord | H04L 9/0861 |
| | | | | 726/9 |
| 2017/0223190 | A1 | 8/2017 | Mandel | |
| 2017/0323045 | A1 * | 11/2017 | Huang | G06F 30/34 |
| 2019/0028608 | A1 | 1/2019 | Kang et al. | |
| 2019/0098107 | A1 | 3/2019 | Howard et al. | |
| 2019/0140913 | A1 | 5/2019 | Guim Bernat | |
| 2019/0188386 | A1 | 6/2019 | Pogorelik et al. | |
| 2019/0354427 | A1 * | 11/2019 | Novak | G06F 11/0772 |
| 2020/0007931 | A1 | 1/2020 | Ho et al. | |
| 2020/0073882 | A1 | 3/2020 | Guggilla et al. | |
| 2020/0250312 | A1 | 8/2020 | Kumar Addepalli et al. | |
| 2021/0021630 | A1 * | 1/2021 | Mullin | H04L 63/1433 |
| 2021/0329466 | A1 | 10/2021 | Khasnabish et al. | |
| 2022/0078180 | A1 * | 3/2022 | Trapani | H04W 48/10 |
| 2022/0215707 | A1 * | 7/2022 | Trapani | H04L 63/10 |
| 2024/0073248 | A1 * | 2/2024 | Barton | H04L 63/20 |
| 2024/0256649 | A1 * | 8/2024 | Chen | G06F 21/602 |

FOREIGN PATENT DOCUMENTS

| | | | |
|---|---|---|---|
| CN | 110704850 A | 1/2020 | |
| CN | 111224950 A | 6/2020 | |
| CN | 111460443 A | 7/2020 | |
| CN | 111538598 A | 8/2020 | |
| CN | 112699391 A | 4/2021 | |
| FR | 3006082 A1 * | 11/2014 | ....... H04N 21/63345 |

OTHER PUBLICATIONS

Vepakomma et al., "No Peek: A Survey of private distributed deep learning," Massachusetts Institute of Technology, Cambridge, MA 02139, U.S.A., Dec. 8, 2018.

Dwork, C., "Differential Privacy." In: Bugliesi M., Preneel B., Sassone V., Wegener I. (eds) Automata, Languages and Programming. ICALP 2006. Lecture Notes in Computer Science, vol. 4052. Springer, Berlin, Heidelberg.

McMahan et al., "Communication-Efficient Learning of Deep Networks from Decentralized Data," Proceedings of the 20th International Conference on Artificial Intelligence and Statistics (AISTATS) Feb. 28, 2017. Journal of Machine Learning Research, vol. 54.

Gupta et al., "Distributed learning of deep neural network over multiple agents," Journal of Network and Computer Applications, Aug. 15, 2018, vol. 116, pp. 1-8.

Bottou et al., "Optimization Methods for Large-Scale Machine Learning," SIAM Review, Feb. 8, 2018, vol. 60, No. 2, pp. 223-311.

Ayala-Rivera et al., "A Systematic Comparison and Evaluation of k-Anonymization Algorithms for Practitioners," Transactions on Data Privacy, Dec. 2014, vol. 7, No. 3, pp. 337-370.

Hitaj et al., "Deep Models Under the GAN: Information Leakage from Collaborative Deep Learning," Proceedings of the 2017 ACM SIGSAC Conference on Computer and Communications Security, Dallas, TX, U.S.A., Oct. 30-Nov. 3, 2017, pp. 603-618.

Bonawitz et al., "Practical Secure Aggregation for Privacy-Preserving Machine Learning," Proceedings of the 2017 ACM SIGSAC Conference on Computer and Communications Security, Dallas, TX, U.S.A., Oct. 30-Nov. 3, 2017, pp. 1175-1191.

Mohammad Masdari, Marzie Jalali, A survey and taxonomy of DoS attacks in cloud computing, Security and Communication Networks, 9(16), 2016.

* cited by examiner

SYSTEMS AND METHODS FOR SUPPORTING NETWORK-BASED COMPUTING SERVICES

RELATED APPLICATIONS

This application is a continuation of International Patent Application No. PCT/CN2021/098733 filed Jun. 7, 2021 entitled "SYSTEMS AND METHODS FOR SUPPORTING NETWORK-BASED COMPUTING SERVICES".

FIELD OF THE INVENTION

This invention pertains generally to the field of network-based computing services and in particular, to methods of supporting, managing, and improving the security of a computing service in which computing and storage are primarily performed on network nodes that are close to a network's edge.

BACKGROUND

Edge computing (EC) is a way of computing that reduces transmission delays and bandwidth consumption by moving computation and storage close to the network edge, and therefore closer to an end user. This fusion of networking and computing is envisioned to be a typical scenario of next generation wireless systems, including 6G.

Typical EC applications include those having a large bandwidth or stringent delay requirements, such as artificial intelligence (AI) applications, augmented reality (AR) games, virtual reality (VR) games, machinery, and others. As EC techniques are further developed, it is anticipated that EC capabilities and platforms like edge clouds, will be deeply deployed in networks (e.g. on radio node) and widely available for use.

In the present disclosure, "computing service", "service" and "application" are equivalent and can be used interchangeably, unless clarified otherwise.

Typically, to make use of EC, an authorized service provider can make a request to deploy its computing service in a network. However, edge clouds can be provided by different vendors and be managed by different parties that do not necessarily trust each other, such as different network operators and other $3^{rd}$ parties. In such multilateral environments, which are becoming more open and more diversified than current and previous-generation networks, infrastructure network security is an inherent challenge and it must be resolved at the system architecture level. To address ever-increasing concerns about privacy, 6G networks are expected to offer privacy protection to customers, including protection of device privacy and protection of data privacy.

The prior art lacks an approach for mitigating the security risks inherent when computing resources are allocated to an application controlled by one party, are executed using the resources of another. For example, if an application of a first party is executed at the edge of a network operated by a network operator. Methods and systems are therefore required to obviate or mitigate one or more limitations of the prior art, by managing and support a service, in a way that allows a reduction of related security risks, from a system architecture design point of view.

This background information is provided to reveal information believed by the applicant to be of possible relevance to the present invention. No admission is necessarily intended, nor should be construed, that any of the preceding information constitutes prior art against the present invention.

SUMMARY

Embodiments of the present invention address security risks related to edge computing, by taking a systems architecture approach. Embodiments relate to the deployment and operation of computing services in a network setting, where one or more network-based tasks can be executed. A task is a procedure requiring interactions between at least two different network entities. Providing an example, in the context of an artificial intelligence (AI) model buildup, examples of tasks are data preparation tasks, model training tasks, and model validation. Each task can include a plurality of routines, each routine comprising data communications between two service functions, via privacy routers. Service functions can be chained, and each of the routines corresponds to two adjacent service functions in the chain. The routines can be executed based on information from a routine manager. A routine manager can obtain data from a task manager, which can obtain data from a work manager, which can obtain data from a service manager. By having routines of a computing being performed on network nodes via privacy routers in accordance with instructions from a routine manager, and an architecture according to embodiments, the computing service can be implemented to perform on a network cloud with improved security, compared to methods of the prior art.

Embodiments include a system operative to execute a computing service, the computing service comprising at least one routine and at least one service function, each routine associated with a routine server function and a routine client function, the system comprising: at least one routine manager operative to execute a routine and configured for: receiving a synchronization requirement associated with the routine; inviting a first routine client, according to the synchronization requirement, the first routine client being an instance of the routine client function, to perform a first data communication with a routine server, the routine server being an instance of the routine server function; inviting a second routine client, according to the synchronization requirement, the second routine client being an instance of the routine client function, to perform a second data communication with the routine server; at least one first privacy router operative to forward data traffic associated with the first data communication between the routine server and the first routine client; at least one second privacy router operative to forward data traffic associated with the second data communication between the routine server and the second routine client. In embodiments, a synchronization requirement can be for sequential communication, and inviting the second routine client can performed before the first data communication. In embodiments, a synchronization requirement can be for parallel communications and inviting the second routine client to perform the second data communication with the routine server, can occur prior to the completion of the first data communication. In embodiments, inviting the second routine client further comprises receiving a notification about the completion of the first data communication. In embodiments, a privacy router can receive from the routine manager instructions indicating to perform proxy re-encryption on the data traffic, and performs accordingly. In embodiments, the first privacy router and the second privacy router can be the same entity. In embodiment, at least one routine client can be a terminal device. In embodiments, the synchronization requirement can include information identifying at least one of the routine client function and the routine server function. In embodiments, routines and service functions of the computing service can be grouped into at least one task, and the system can further comprise at least one task manager, the task manager configured to be interfaced to communicate with at least one routine manager, and operative to receive an order to execute a task; coordinate the execution of routines of the task, in accordance with inter-routine dependency and allocate an execution identifier to each routine execution; identify at least one routine manager associated with each routine; and notify the routine manager to execute the routine. In embodiments, tasks can be grouped into works, and the system can further comprise a work manager, the work manager configured to be: interfaced to communicate with at least one task manager, and operative to: receive an order to execute a work; coordinate the execution of tasks of the work, in accordance with inter-task dependency; select at least one task manager to execute the tasks of the work; and send each task order to a selected task manager. In embodiments, the computing service can comprise works, and the system can further comprise a service manager, the service manager configured to be interfaced to communicate with at least one work manager, and operative to receive work orders; select a work manager for each work order based on the workload of each work manager; allocate information identifying each work order; allocate information identifying the execution; send the information to a selected work manager; forward identified work orders to selected work managers; and trigger an execution of a work associated with the service. In some embodiments the method further includes allocating information identifying the execution of the work. In embodiments, the service manager can be further operative to obtain inter-task dependency data associated with a work; and provide inter-task dependency data to a work manager. In embodiments, a system can further comprising an application controller, interfaced to communicate with the service manager, and operative to manage the computing service by interacting with the service manager, including: sending a work order to a service manager, and receiving a notification that the execution of a work order is complete. In embodiments, a system can further comprise at least one service data repository, interfaced to communicate with at least the service manager, a work manager, and a task manager, and operative to receive, store and send information including one or more of: information identifying each computing service, a service profile for each computing service, information identifying each work, work data indicating the inter-task dependency, task data indicating the inter-routine dependency, routine data indicating the synchronization requirement, compute plane data indicating the at least one first privacy router and the at least one second privacy router, service function data indicating the routine server function and the routine client function, and deployment data indicating the first routine client, the second routine client and the routine server. In embodiments, the at least one service data repository can be further operative to receive, store and send information including user subscription data. In embodiments, the at least one service data repository can be further operative to receive, store and send information including device status information. In embodiments, the task manager is further operative to select at least a number k of devices so as to ensure k-anonymity among the devices, wherein the value of number k can be indicated in the routine data, task data or in a local configuration. In embodiments, task manager is further operative to select devices, associate the devices to routine managers, and notify the routine managers about the devices, such as to allow the routine manager to invite the devices.

Embodiments include a method of executing a computing service, comprising: coordinating, by a routine manager, the execution of a routine which form the computing service, in accordance with respective synchronization requirement; wherein the execution of a routine includes a process of: performing proxy re-encryption on data from the routine, forwarding the data from the routine. In embodiments, coordinating the execution of a routine can includes triggering the execution of a routine, which can comprise: sending a first notification to a privacy router configured for processing the data related to routine execution, the processing comprising performing proxy re-encryption on the data by using a re-encryption key related to the receiver of the data and forwarding re-encrypted data from the routine, and forwarding a second notification to an instance of a routine server function, wherein the first notification includes: information identifying the computing service and information identifying the routine; sending a third notification to a privacy router configured for processing the data related to routine execution, the processing comprising performing proxy re-encryption on the data by using a re-encryption key related to the receiver of the data and forwarding re-encrypted data from the routine, and forwarding a fourth notification to an instance of a routine client function; wherein the third notification includes: information identifying the computing service and information identifying the routine; wherein at least one privacy router is further configured to initiate a communication between the instance of a routine server function and the instance of a routine client function, in accordance with communication instructions; and processing the data related to routine execution is performed in accordance with communication instructions. In embodiments, the communication instructions can be included in a notification to a privacy router. In embodiments, processing the data related to routine execution can further comprise performing proxy re-encryption on the data by using a re-encryption key related to the receiver of the data. In embodiments, a re-encryption key can be pre-configured in the privacy router, or is received from the routine manager as part of the communication instructions. In embodiments, the method further includes receiving, by the routine manager, from the instance of a routine server function, or the instance of a routine client function, a notification that a data communication is completed. In embodiments, a routine manager can receive from an instance of a routine client function, a notification that a data communication is completed. In embodiments, coordinating the execution of a routine can include: sending, by the routine manager to a first instance of a service function, a first invitation message; sending, by the routine manager to a second instance of a service function, a second invitation message; receiving, by the routine manager from the first instance of a service function, a first accept message that includes security material for performing proxy re-encryption of the routine's data; and receiving, by the routine manager from the second instance of a service function, a second accept message that includes security material for performing proxy re-encryption of the routine's data; wherein the sending of each message is facilitated with a privacy router. In embodiments, one or more of the first invitation message and the second invitation message further includes one or more of: information identifying the computing service, information identifying a routine, information identifying a routine execution. In embodiments, sending an invitation message can further comprise sending an outer message that includes the invitation message. In embodiments, an outer message can further include routing information related to a privacy router. In embodiments, coordinating the execution of a routine can include: receiving a notification, by the routine manager, from a task manager having obtained information associated with a service profile of the computing service, to execute the routine; sending an acknowledgment, from the routine manager to the task manager; sending an invitation, from the routine manager to an instance of a routine server function, to contribute to the routine execution; sending an invitation, from the routine manager to at least one instance of a routine client function, to contribute to at least one routine execution; executing, by the routine manager, a routine communication procedure with each instance of a routine client function. In embodiments, coordinating the execution of a routine can further include: executing at least one routine, by at least one routine manager including the routine manager, based on data obtained by a task manager, including data allowing the selection of the at least one routine manager; routine data associated with the at least one routine; task data associated to a task; compute plane data related to a task; and a request from a work manager, to trigger the task that includes the at least one routine. In embodiments, a work manager can be selected by a service manager, receive a work order from the service manager, and operative to receive work data associated with the work, receive information as to how to execute the work, and receive at least one execution condition. In embodiments, a task manager can further be operative to select at least a number k of devices so as to ensure k-anonymity among the devices, wherein the value of number k can be indicated in the routine data, task data or in a local configuration. In embodiments, a task manager can further be operative to select devices, associate the devices to routine managers, and notify the routine managers about the devices, such as to allow the routine manager to invite the devices.

Further embodiments include apparatus and systems for executing the methods described herein. For example, an apparatus comprising a processor coupled with a memory storing instructions, when executed by the processor, configure the apparatus to perform a method as described and claimed herein.

Further embodiments include a machine readable medium storing instructions, when executed by a processor, configure the processor to perform a method as described and claimed herein.

DETAILED DESCRIPTION

Figure 1:
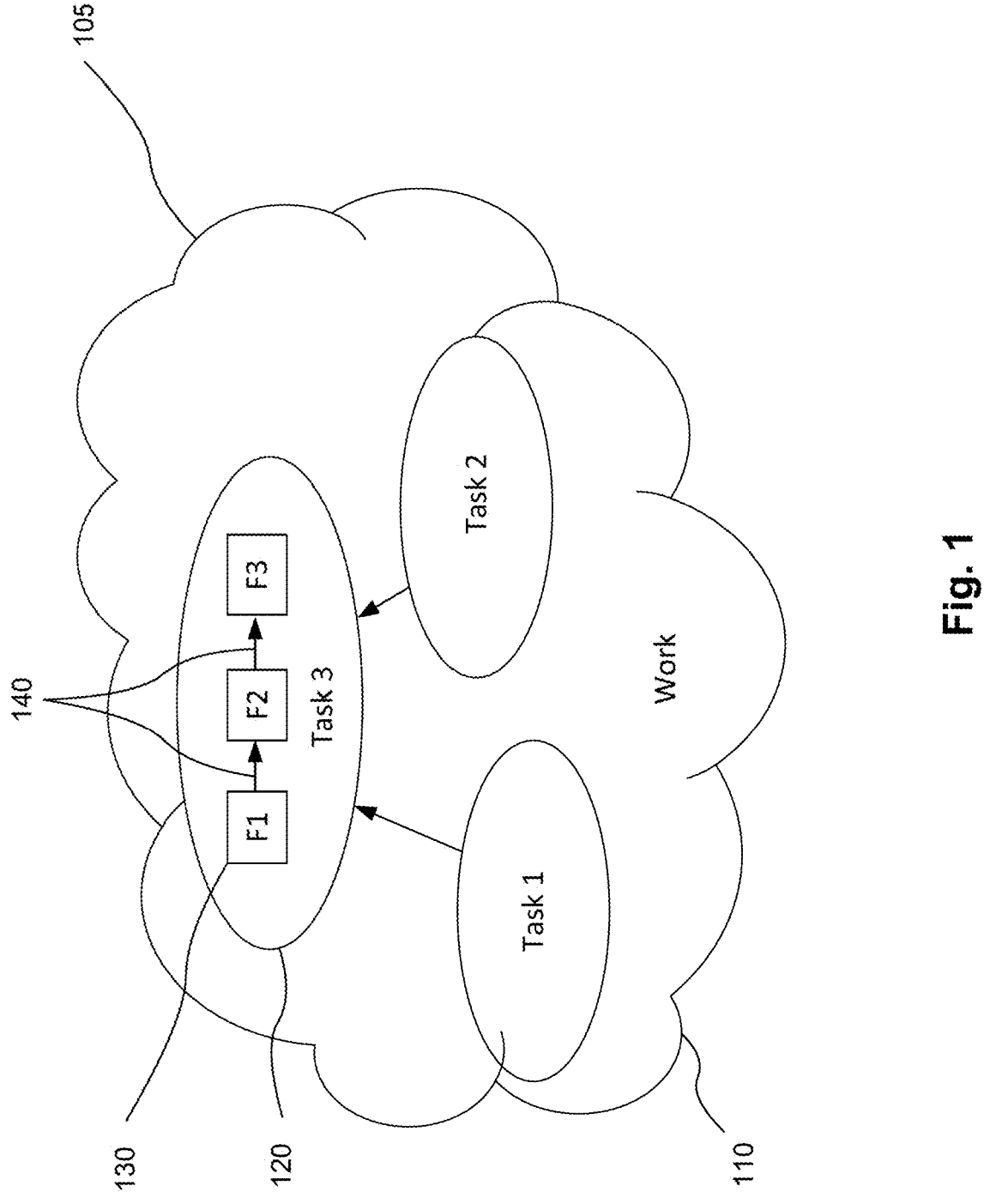
FIG. 1 illustrates a service and the relations between a work, tasks, and service function, as well as service function chaining, according to an embodiment.

Open network infrastructures are expected to increasingly fuse networking and computing both in the radio access network (RAN) and in the core network (CN). Next generation networks are expected to make computing capabilities available closer to a network's edge, such as RAN nodes. This fusion near a network edge can be referred to as edge computing (EC). EC capabilities however, can be different from vendor to vendor and be managed by different parties. Thus, various issues must be addressed. These can include bandwidth requirements, quality of service (QoS) requirements, the applications involved, infrastructure network security and device privacy and data privacy.

In a traditional networking paradigm, where a primary goal is to provide connectivity, and an application can be served at least partly from separate service functions, the deployment locations of service functions forming the application, can be returned to the service provider and they can be known to the application layer, which can initiate inter-function communication according to deployment locations. However, the disclosure of deployment locations can bring security risks to the infrastructure network, in particular to edge clouds. A deployment location can be disclosed in the form of a routable ID (e.g. an IP address) or a non-routable ID (e.g. a data network access identifier or "DNAI").

In the case of routable IDs, the IDs can be used directly in the transport network layer (TNL), for routing data to respective service functions. Adversarial or compromised network entities can send massive malicious packets using the IDs and consequently overwhelm or disable the corresponding service functions and EC platforms. This is known as a denial of service (DoS) attack, and its handling can be left to EC platforms.

In the case of non-routable IDs, additional mechanisms can be required to map the non-routable IDs to routing decisions. This can either mean modifying the TNL, so that routing is based on non-routable IDs, or modifying an upper layer, so that the non-routable IDs are converted to routable addresses. In either case, the TNL or upper layers must be relied on again to handle the security risk.

Edge computing can include application-based networking, and embodiments can provide methods and systems for managing and supporting network-based computing services, as well as for improving their security. In particular, embodiments can address the security and privacy requirements of a computing network where functions make use of edge nodes, and provide methods and systems to manage and support the related network-based computing services.

Embodiments can resolve problems including:

Regarding privacy protection and security: the participating entities (e.g. devices, application servers) should be invisible to each other. To realize this, embodiments can protect edge cloud locations from being disclosed and provide k-anonymity protection to devices. A release of data is said to have the k-anonymity property if the information for each device contained in the release cannot be distinguished from at least k–1 devices, whose information also appear in the release.

Regarding data confidentiality, embodiments can protect the content of data traffic from a platform. This can be achieved along with privacy protection, in cases where communicating parties do not know about each other.

Regarding compute management, embodiments can coordinate and synchronize networked computing processes, such as works, tasks, and routines as described below, with respect to dependency requirements.

It is noted that the terms 'compute' and 'computing' are used interchangeably herein. Furthermore the terms 'application', 'service', 'computing service' are used interchangeably herein.

In an embodiment of application-based networking, computing can take place in the form of tasks, and rely on the network's involvement. Instead of initiating data routing, an application layer can send a task request to an application-based service platform, and the platform can accordingly trigger a task execution by signaling proper service functions, with respect to coordination requirements, and route data between the service functions during the task execution. The platform can then return the computing results to the application layer. This method can be referred to as task management, and it can provide enhanced security and privacy protection, including:

Not disclosing deployment locations, for example by not disclosing deployment locations and task executions, Participating service function are invisible to each other, In an application, tasks can be grouped into works. In the particular example case of an AI application, a work can be related to building up an AI model, and it can include a variety of tasks such as a data collection and preparation task, a model training task, and a model validation task. Further, the model validation task can depend on the model training task, which can in turn depend on the data collection and preparation task. Another work in the AI application can be related to AI inference. However, it should be appreciated that the invention is not limited to AI applications, and other applications can be supported.

In general, a computing service of an embodiment can be an application-layer service, and include one or more works that can be said to belong to the computing service, or be associated with it. A work of an embodiment can be exposed to a service consumer (i.e. an entity consuming or using the service), and a service consumer can choose to participate in, join in, or contribute to an execution of the work. Additionally, embodiments can allow for a flexible management of a work load, by function separation.

In an embodiment supporting a computing service, a work in general can include one or more tasks. For example, if a work is for an AI service, it can include tasks for data preparation, model training, and model validation, and during an execution, the tasks can be executed. A task can be considered to belong to the computing service, or be associated with it. If there are many tasks, they can be inter-dependent. For example, a first task can depend on a second task if the first task requires the computation result of the second task as an input. The first task should therefore be executed after the second task has been executed. A dependency can be indirect in the sense that a first task can indirectly depend on a second task, if the first task directly depends on the result of a third task, which directly depends on the result of a second task. When two tasks are not inter-dependent, either one can be executed first, or they can be executed in parallel. The inter-dependency between tasks can be referred to as inter-task dependency or as intra-work dependency. In this context, parallel implies execution of a second task can commence prior to the completion of the first task. They can commence simultaneously, but this is not required.

In embodiments, a task can include one or more service functions, and two service functions can be linked together by a routine. Each routine can refer to a communication between two service functions, as well as a computing/networking step of the task. The one or more routines can be considered to belong to a service, or be associated with it, and there can be inter-dependency between the routines. If a first routine depends on a second routine, because for example the first routine requires the computation result of the second routine as an input, the first routine should be executed after the second routine has been executed. A dependency can be indirect in the sense that a first routine can indirectly depend on a second routine because it directly depends on a third routine that depends on the second routine. When two routines are not inter-dependent, either one can be executed first, or they can be executed in parallel. The inter-dependency between routines can be referred to as inter-routine dependency, or intra-task dependency. In this context, parallel implies execution of a second routine can commence prior to the completion of the first routine. They can commence simultaneously, but this is not required.

In an embodiment, a task can be associated with service function chaining (SFC, or simply "chaining"). SFC can reflect the networking logic flow of a computing service and its tasks, and include terminal devices as service functions. Each routine of a task can be a step in a task and correspond to a link in an SFC, such that during an execution of a task, routines can be performed in the order defined by the direction of routine links. The deployment of service functions can be subject to SFC requirements and resource requirements, as specified by the service provider. Following a request, a network can deploy (i.e. instantiate) a service function in edge clouds, considering resource availability and network conditions.

FIG. 1 illustrates a computing service (i.e. an application) and the relations between a work, tasks, and service functions associated with it, as well as service function chaining, according to an embodiment. A service 105 can include at least one work 110, which can include at least one task 120, for example, task 1, task 2 and task 3 120, and each task can include at least two service functions 130 and at least one routine providing communication between the service functions. The routines can be run in sequence and if they are, the sequence can correspond to a service function chain (SFC) 140 comprising the service functions. Accordingly, in some embodiments, each task can include one or multiple routines, and each routine involves two service functions. The one or multiple routines can be run in sequence. In some embodiments, the one or multiple routines can be run in parallel. In this context, parallel implies execution of a second routine can commence prior to the completion of the first routine. They can commence simultaneously, but this is not required.

In an embodiment, a service function can be instantiated at multiple locations of a network, such as to have multiple instances of the service function, and this can require multiple task managers and multiple routine managers, each of which being located to manage tasks and routines related to instances of the service function.

When needed (e.g. upon request or on certain events), a work or a task associated with a computing service can be executed. An execution can be triggered at either of a work level and a task level, upon a request (referred to as a work order or a task order), upon the occurrence of certain events, or under certain conditions. In embodiments, a task can refer to the smallest execution unit. During an execution of a work, the tasks of the work can be executed with respect to the inter-task dependency (or intra-work dependency) associated with the work, such that inter-task dependency is not violated. During an execution of a task, the routines of the task can be executed with respect to the inter-routine dependency (or intra-task dependency) associated with the task, such that inter-routine dependency is not violated. During an execution of a routine, data communications can occur between a routine server and routine clients associated to the routine server, with respect to a synchronization requirement associated with the routine (as described above), such that the synchronization requirement can be satisfied/met. The routine server is an instance of a first service function (which can be referred to as routine server function) associated with the routine, and the routine clients are instances of a second service function (which can be referred to as routine client function) associated with the routine, as described below.

In embodiments, a routine can be associated with a first service function and a second service function. In an embodiment, the first service function does not represent or indicate devices and can be referred to as a routine server function, while the second service function may or may not represent or indicate one or more devices and can be referred to as a routine client function. When a routine client function represents one or more devices, it implies that it is running on the one or more devices, or that the one or more devices will participate in an execution of the routine, as a routine client function. The two service functions can be considered to belong to, or be associated with, the computing service, and each of them can have one or more instances.

In embodiments, if a service function, either a routine server function or a routine client function, does not represent one or more devices, each instance of the service function can correspond to a deployment location of the service function. The deployment location is a network location where the service function is instantiated or deployed.

When a routine client function does represent one or more devices, the one or more devices represented by the routine client function can be considered as instances of the routine client function. In this case, a routine can be associated with information identifying the devices, which can further be associated with the routine client function.

In embodiments, an instance of a routine server function can be referred to as a routine server. It can be associated with one or more instances of a routine client function, each of which referred to as a routine client. During an execution of a routine, a routine server communicates/interacts with the one or more routine clients during an execution of the routine. A routine can be associated with a synchronization requirement, which can indicate whether the routine server should communicate/interact with the one or more routine clients in parallel or in sequence (i.e. sequentially, one after another). The former case can be referred to as parallel communication, and the latter as sequential communication. In this context parallel implies a second communication (between the routine server and a second routine client) can commence prior to the completion of a first communication (between the routine server and a first routine client). They can commence simultaneously, but this is not required.

Embodiments include a system, which can be a platform, for supporting a network-based computing service, with respect to the concepts of work, task and routine as described herein. A platform according to an embodiment can support the deployment and operation of a computing service in a network environment. A platform can be operated by a third party and in contrast to a service consumer (i.e. a consumer of the service, which is an entity consuming/using the service) and a service provider (i.e. a provider of the service, which is an entity providing/offering the service), a third party can be referred to as platform operator.

A platform (referred to as NET4AI platform) according to an embodiment can include many entities, some of which can be described as follows:

a service manager, for handling, per service: service registrations, de-registrations, modifications, configurations, and for interfacing with external entities, such as for receiving work orders and task orders;

a work manager, for handling, per work or per service, work orders, task order dispatch, and for coordinating tasks according to inter-task dependency;

a task manager, for handling, per task, task orders, and for coordinating routines according to intra-task dependency;

a routine manager, with functionalities, for handling, per routine, routine execution including starting/stopping a routine execution, and for coordinating routine clients to join a routine execution according to synchronization requirements.

a privacy router, with functionalities, for handling, per routine, message forwarding during a routine execution.

Entities of a platform according to an embodiment can be control plane entities and include a service manager, a work manager, an access manager, at least one task manager, an orchestrator, and a service data repository, which can also be referred to as a unified data repository.

Entities of a platform can be compute plane entities and include a routine manager, and a privacy router.

The entities of an embodiment can be logical entities and the links between entities can indicate the interfaces or connections that they use to interact or communicate with each other.

In embodiments, control plane entities can be integrated into, or be implemented by, a same network entity, such as a platform controller. For example, in an embodiment, a platform controller can implement or provide some of the control plane's functionalities, and in other embodiments, a platform controller can implement or provide the entire control plane's functionalities. In yet other embodiments, a service manager and a work manager can be combined to form a service-and-work manager; and a routine manager and a privacy router can be combined into a coordinator.

Platform entities and some of their functions, according to embodiments, can be described as follows.

According to embodiments, an entity in a platform can be an orchestrator operative to determine deployment locations of service functions of an application. Further, an orchestrator can select a compute plane for an application, including a logical topology of the compute plane. An orchestrator can also determine which resources are needed at deployment locations, and over the communication links of a logical topology; and it can interact with a resource manager, which can be in the infrastructure network in some embodiments, to provide computing and networking resources accordingly, such as radio resources, transport resources, compute resources (e.g. CPU cycles, I/O access, memory, storage), and others.

In embodiments, an access manager can act as a control plane interface with a device. It can perform mobility management for the device, and it can authenticate/authorize a device to connect to the platform.

In embodiments, a service manager can perform a registration, a registration update, and a deregistration for an application. A service manager can also authenticate and authorize a device to use an application, act as control plane interface with external entities, e.g. an application controller, and select a work manager to handle a work order.

In embodiments, a work manager can execute a work according to a request, which can be referred to as a work order. An execution can include receiving a work order from a service manager and coordinating the execution of tasks of the work, with respect to inter-task dependency. A work manager can also dispatch a task order. This can include selecting a task manager and sending the task order to a selected task manager. A task order can be received by the work manager from a service manager, or be generated by the work manger, and can be associated with a work execution.

According to embodiments, an entity in a platform can be a task manager, which can execute a task, and/or handle a task order (which is a request for executing a task). This can include receiving a task order from a work manager and coordinating the execution of routines that are part of a task execution, with respect to inter-routine dependency. A task manager can also trigger a routine execution. This can include allocating an execution ID for a routine execution, identifying at least one routine manager associated with the routine, and notifying a routine manager to execute the routine. This can further include allocating a differentiator for the routine execution.

According to embodiments, an entity in a platform can be a service data repository that can store a service profile for each registered computing service. A service profile can also be referred to as service data. In some embodiments, a service data repository can also store user subscription data.

In embodiments, a routine manager can provide routine synchronization, by triggering data communication between a routine client and a routine server with respect to a synchronization requirement associated with the routine. It can also include k-anonymity provisioning, which can include ensuring the participation of a minimum number k of devices in a routine execution, when a routine involves devices, such as UEs. Devices in this invention disclosure include terminal devices, such as UEs, IoT devices, sensors, robots, vehicles, drones. Devices also include network entities, such as, servers, that are treated as devices. In some embodiments, when the service function represent devices, then an instance of a service function can be implemented by a device, and the device is considered to be an instance of the service function. In other embodiments, when the service function does not represent devices, the service function is a local entity and can be instantiated/deployed at a network location, e.g. in an edge node. An edge node can correspond to an edge cloud. When the service function is instantiated/deployed at a network location, an instance of the service runs at the network location, e.g. by being hosted by and run on a server (e.g. an application server (AS)) at the network location.

According to embodiments, an entity in a platform can be a privacy router that can provide signal and data routing. This can include forwarding compute plane control signals and data traffic, during a routine execution. A privacy router can also include performing proxy re-encryption on outgoing data traffic, before forwarding, thereby allowing user device privacy and data confidentiality at the same time.

In embodiments, a resource manager can provide computing and network resources according to resource requirements received from an orchestrator during service registration or service registration update, for example via an interface/connection. Using information received from a task manager via an interface/connection, a resource manager can also adapt the provisioning of resources to a network's dynamics, and it can meet end-to-end quality-of-service (QoS) requirements, at a per-task granularity of execution.

In embodiments, an application controller (AC) can be in charge of managing a computing service. An AC can belong to, or be controlled by a service provider (providing the computing service), and can itself represent the service provider. An AC can connect to a service manager via an interface or connection, to manage a computing service, for example, to register and deregister the service, to update the registration of a service, or to trigger an execution of a work or a task associated with the service.

In embodiments, an AC can be integrated with an application server (AS), or it can be a separate entity (i.e. separate from the AS). An AS can be located at a network location, and a network location can be identified by an ID, such as a data network access identifier (DNAI), or by a network address, such as an IP address. When a service function is deployed or instantiated at such a network location, an instance (i.e. a copy of software implementation) of the service function can be hosted by (i.e. it can run on) a server (e.g. an application server (AS)) at the network location. A network location can refer to an edge cloud.

When or after a computing service is registered on a platform, a service function associated with the service can be deployed at a selected network location and it can connect to a compute plane selected for the computing service. A compute plane can include any number of privacy routers and routine managers. Privacy routers can be interconnected via interfaces or connections and can form a data sub plane. Each service function instance (essentially the AS's hosting them) can connect to a privacy router in the compute plane via an interface or connection. Two service function instances, e.g. a routine client and a routine server, associated with a routine, can communicate during an execution of the routine via their associated (connected) privacy routers.

In embodiments, a device can access a computing service by participating in an execution of a routine of the computing service and essentially an execution of a work of the computing service, the routine being associated with the work. The device can connect to a privacy router associated with a routine server of the routine. The device can connect to the privacy router via an access network (AN) node, which can be connected with a privacy router through an interface or connection. An AN node can be for example a radio access node (e.g. a cellular base station, a Wi-Fi access point, a satellite, etc.). Another example of an AN node is a wireline access node. A device can participate in a routine execution by communicating with a routine server as a routine client, via a privacy router during a routine execution.

In embodiments, an AC can send a work order or a task order to a platform. A platform can trigger the execution of corresponding work or tasks by signaling proper service function instances, and by forwarding subsequent data traffic between the service function instances, with respect to inter-task dependency and intra-task deplendency. Data originating from a service function instance during an execution can be in the form of ciphertext and it can be forwarded by a platform without any decryption. Before forwarding data, a platform can re-encrypt the data so that the intended receiver (i.e. a different service function instance) can recover from it the original data (plaintext), using a private key of the receiver.

The following describes how a platform according to an embodiment can manage and coordinate the execution of works, tasks and routines, using any number and combination of work managers, task managers and routine managers, each of which can be a virtual network function or a non-virtual network function.

In an embodiment, it can be assumed that at some point, a computing service has been registered, in that service functions associated with the computing service have been deployed, a compute plane has been selected for the computing service, and service function instances have been connected to the compute plane. Each routine manager in the compute plane can be configured, and for each routine associated with a routine manger, with some service data (i.e. all or part of the service profile of the computing service) is related at least to the routine, so that the routine manager can manage an execution of the routine accordingly. Service data related to the routine can include routine data, deployment data, and compute plane data. These data are described elsewhere in this disclosure. In some embodiments, a service registration can be performed by a service manager upon request from an AC. In some embodiments, a service registration can be pre-configured by, for example, a system administrator, or by a management system.

Figure 2:
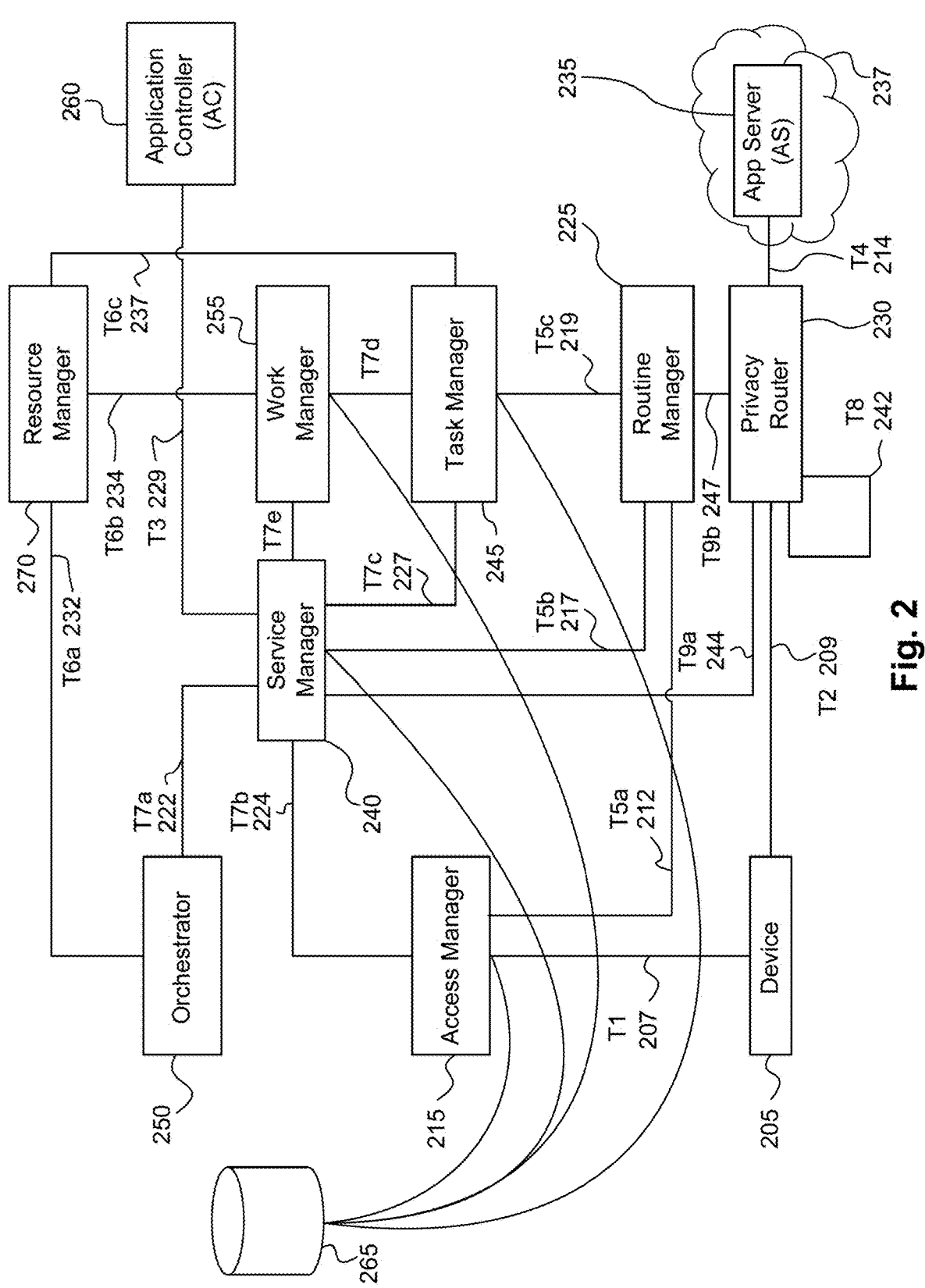
FIG. 2 illustrates a system architecture of a platform, according to an embodiment that can manage and coordinate the executions of works, tasks and routines.

FIG. 2 illustrates a system architecture of a platform, according to an embodiment that can manage and coordinate the executions of works, tasks and routines. A device 205 can connect to an access manager 215 with a connection T1 207, and the device 205 can be also connected to a privacy router 230 with a connection T2 209. The access manager 215 can be connected to a routine manager 225 through a connection T5a 212.

The privacy router 230 can be connected to an application server 235 in an edge cloud 237, through a T4 connection 214. The routine manager can be connected to the access manager 215, a service manager 240 and at least one task manager 245, through respective connections: T5a connection 212, T5b connection 217 and T5c connection 219. The service manager 240 can be connected to an orchestrator 250, the access manager 215 and a work manager 255 through respective connections: T7a connection 222, T7b connection 224 and T7c connection 227, as well as to an application controller 260 through a connection T3 229. A resource manager 270 can connect to the orchestrator 250, the work manager 255, and the task manager, through respective connections: T6a connection 232, T6b connection 234, and T6c connection 237.

In an embodiment, there can be a plurality of routine managers 225 and a plurality of privacy routers 230. In such cases, a privacy router can be connected to another privacy router through a connection T8 242. Each privacy router can also be connected to the service manager T9a 244. Further, a routine manager 225 can be connected to a privacy router 230 via a connection T9b 247.

A service profile can include information identifying a computing service, service meta-information, and service availability information. The information identifying a computing service can include either or both of a service ID and a service name. The service meta-information can indicate a service provider, i.e. an entity providing the computing service. The meta-information can further describe/indicate each work associated with the computing service and the functionality and purpose of each work. The service availability information can indicate when or where the computing service is available, including a time period in the form of a calendar time, and a location in the form of an area ID, or both.

A service profile can further include data or information describing each service function, each work, each task, each routine, a service deployment, and a compute plane, all of which are associated with a computing service identified in the service profile. The data (or information) can be referred to as service function data (information), work data (information), task data (information), routine data (information), deployment data (information) and compute plane data (information) respectively.

FIG. 2 further illustrates a service data repository 265, according to an embodiment. The service data repository 265 can be connected to an access manager 215, a service manager 240, a work manager 255, and a task manager 245, through direct connections.

Service function data can be associated with each service ("per-service") and it can include information for each service function associated with a computing service. Service function data can include information identifying a service function, such as a function ID. A service function can be identified as representing devices, if the information so indicates. In other words, in some embodiments a service function can represent devices, and each of these devices is considered as an instance of the service function. In some embodiments, the information identifying a service function can have a particular/reserved format or value, indicating the service function represents devices.

In some embodiments, when a service function does not represent devices, as indicated by the information identifying the service function, the service function data can include a software implementation (such as executable files, codes, or images) of the service function, and the service function data can include resource requirement information, such as information indicating the amount of compute resources (e.g. CPU cycles, memory, storage, I/O access) needed by the service function. Service function data can also include outgoing traffic rate, such as information indicating the amount of outgoing traffic that is generated or transmitted by a service function within a certain time unit. Alternatively, this information can indicate a relation between an amount of outgoing traffic and an amount of incoming traffic (which is received by the service function). In other words, an amount of outgoing traffic can be a function of an amount of incoming traffic. This information can further specify the relation or function. For example, it can specify that an amount of outgoing traffic and an amount of incoming traffic are equal, or that an amount of outgoing traffic is equal to an amount of incoming traffic, multiplied by a ratio, which can be a value larger than or equal to 0.

In embodiments, work data can be associated to each work and it can include information for each work associated with the computing service, including:

information identifying the work (e.g. a work ID);

meta-information about the work, which can include information describing the input and the output of the work, such as:

information about input format/structure and output format/structure, and information about how to provide the input and how to receive the output;

information identifying tasks included in the work, such as a list of task IDs, where each task ID identifies a task; and information about inter-task dependency (intra-work dependency) within the work.

In embodiments, task data can be associated with each task and include information for each task associated with a computing service, including:

information identifying the task (e.g. a task ID);

information identifying routines included in the task, e.g. a list of routine ID, where each routine ID identifies a routine;

information about inter-routine dependency (intra-task dependency) among the routine(s) in the task. This information can indicate at least some of the routines in the task that can be executed in parallel (at the same time), or in a specified sequence (in a specified order). In some embodiments, absence of this information can imply that the routines of the task can be executed in parallel.

In embodiments, routine data can be associated with each routine and it can include information for each routine associated with a computing service. Such information can include:

information identifying the routine (e.g. a routine ID), information identifying service functions associated to the routine, device information, synchronization requirement information, and security measures information.

Information identifying service functions associated to the routine (including a routine server function and a routine client function) can be function IDs. The routine server function can be among those identified in a service function data associated with the same computing service. The routine client function can also be among the functions identified in the service function data.

Device information can be information about devices represented by a routine client function associated with the routine. The routine client function can be identified within the information identifying service functions associated to the routine. The device information can be associated with the routine client function. If the routine client function does not represent devices, the device information might not be required. The devices identified in this information (i.e. the device information) can be allowed to participate/join in the execution of the routine. They can also be viewed as instances of the routine client function (i.e. routine clients). The device information can include information identifying the devices, which can include a list of device IDs or network addresses, or a device group ID, or an indication of any device. Absence of the device information can imply the use of any device or the use of a default device group (i.e. devices in a group of default devices). The device information can also include information about potential and possible locations (or location area) of the devices. It can include a list of zone IDs, and each zone can identify a geographic region. A zone ID can be in the form of a cell ID or an access node ID.

Synchronization requirement information can include information describing a synchronization requirement associated with the routine. This information can include a function ID identifying the routine server function, and a function ID identifying the routine client function. In embodiments, a synchronization requirement can be optional.

Security measures information can indicate whether or not proxy re-encryption must be performed on data being forwarded, i.e. whether or not to re-encrypt data, before it is forwarded during an execution of the routine. This information can further include security materials, such as a re-encryption key, for each service function identified in the information identifying the service functions associated to the routine. Per-service function security materials can be used to re-encrypt a data before the data is forwarded to a service function (an instance of the service function).

In embodiments, deployment data can include service function instance information, and service function instance association information.

Service function instance information can include information for each service function that is identified in the service function data and does not represent devices. This information can identify instances of a service function by, for example, including a list of instance IDs. An instance of a service function can correspond to a deployment location of the service function; its ID (i.e. instance ID) can include information (e.g. function ID) identifying the service function and information identifying the deployment location (e.g. a location ID, network address or name).

Inter-function connectivity (connection) information (also referred to as service function instance association information) can be per-routine. A routine is associated with a first service function (e.g. routine server function) and a second service function (e.g. routine client function). The second service function may or may not represent devices, while the first service function does not represent devices. Inter-function connectivity (connection) refers to the association between an instance of the first service function and an instance of the second service function, and implies the two service function instances will communicate/interact with each other during an execution of the routine (and are thus connected). The inter-function connectivity (connection) information indicates inter-function connectivity/connection, i.e. which instance (identified by, e.g. an instance ID) of the second service function is associated/connected with which instance (identified by, e.g. an instance ID) of the first service function for the routine. The service function instances are among those identified in the service function instance information.

In embodiments, compute plane data can include:

privacy router information, privacy router interconnection information, and routine manager information.

Privacy router information can include information identifying each privacy router in the compute plane and, for each identified privacy router, it can further include information identifying each one of the service function instances associated with the privacy router. Service function instances are instances of service functions associated with the computing service and are identified in the service function instance information in the deployment data.

Privacy router interconnection information can include information indicating interconnections (i.e. T8 connections) between privacy routers identified in the privacy router information. Each of the interconnections can be implemented by an interface or connection. This information can include either of a tunnel ID, a connection ID, or a pair of tunnel end point IDs, corresponding to each of the interconnections. Two privacy routers can be interconnected (i.e. have an interconnection in between) when there is an association between two service function instances, respectively associated with them as indicated in the deployment data, by the service function instance association information in the deployment data.

Routine manager information can include information, e.g. IDs or network addresses, identifying each routine manager in the compute plane, and for each identified routine manager, it can further include information (e.g. routine ID(s)) identifying associated routine(s) and information (e.g. instance IDs) identifying each service function instance associated with each of the routines.

Figure 3:
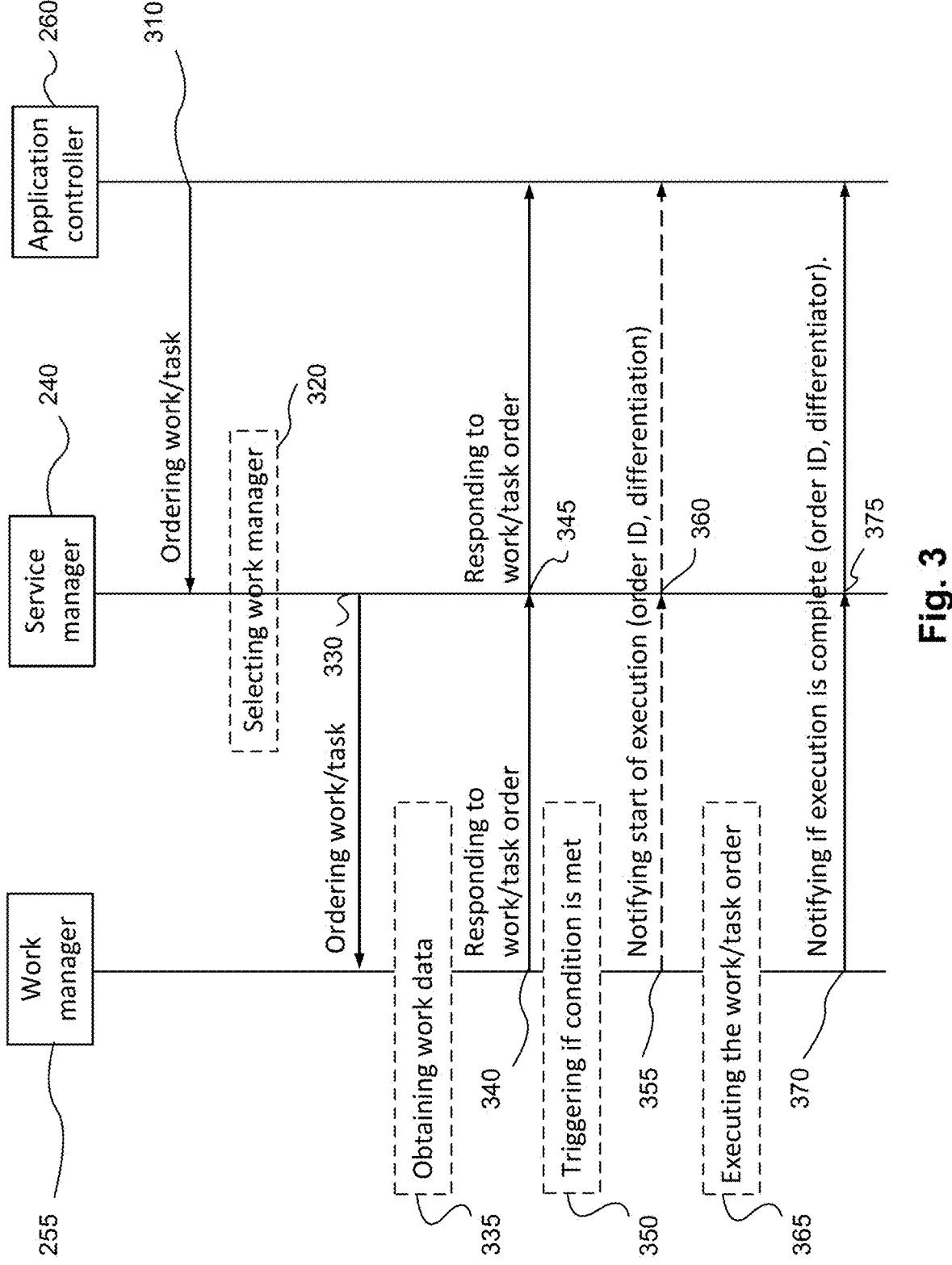
FIG. 3 illustrates an order placement procedure, for handling either a work order or a task order, upon an order from an application controller, according to an embodiment

FIG. 3 illustrates an order placement procedure, for handling either a work order or a task order, upon a request (an order) from an application controller, according to an embodiment. The steps 310-345 leading to a work order or a task order response 345 can constitute an independent procedure and be referred to as an order placement procedure. The subsequent steps 350-375 can constitute another independent procedure and be referred to as an order execution procedure. When an initial order message 310 is a work order, the procedure can also be referred to as a work execution procedure.

In FIG. 3, an order placement procedure can include an application controller 260 operative to order (request) the execution of a work order or a task order 310 by a service manager 240. An order (request) message 310 can be for a new order (request), or for updating an existing order (request), and it can include information about the order (request), such as:

information identifying the order (e.g. an order ID), e.g. if the order is an existing order;

information identifying the computing service, e.g. a service ID;

information identifying the work associated with the order, e.g. a work ID;

information identifying the task associated with the order, e.g. a task ID, if the order is a task order. If such information is present in a message, the task identified by the information can be included in a work identified by information identifying the work. If an order is a work order, this information can be optional.

An order message 310 (i.e. the order itself) can indicate at least one execution condition, upon which the work or task identified in the order message can be executed. For example, conditions can specify when the work or task can be executed, such as immediately, at one or more specified times (e.g. in the form of time of the day/week/month/year), or conditional upon certain events. In some embodiments, when an order message does not explicitly indicate such conditions, it can imply that the work or the task should be executed immediately (i.e. upon receiving the order message).

A service manager 240 can select 320 a work manager 255 to manage the work, according to information in the order message 310 (e.g. the information identifying the computing service and the information identifying the work) and/or local configuration (e.g. the work manager is preconfigured to be selected as indicated in the local configuration). When selecting a work manager 255, the service manager 240 can take into account the load of the work manager. The load of a work manager can be reflected by the number of works that the work manager is managing.

A service manager 240 can forward 330 an order message 310 to a work manager 255. If the order is a new order, the service manager 240 can generate or allocate information (e.g. an order ID) to identify the order and send 330 the information to the work manager 255 (e.g. as part of the order message).

A service manager 240 can obtain work data associated with the work identified in the order message 310 itself, and the work data can be provided 330 to the work manager 255. The work data can include information identifying the tasks included in a work, as well as information about inter-task dependency. To obtain the work data, the service manager 240 can provide information identifying the computing service, and information identifying the work, to a service data repository. Both kinds of information can be included in an order message 310. The service data repository can then send the corresponding work data to the service manager 340.

Alternatively, the work manager 255 can obtain 335, from the service data repository, the work data associated with the work identified in an order message 330. To obtain the work data 335, the service manager 240 can provide the information identifying the computing service and the information identifying the work to the service data repository. The service data repository can then send corresponding work data to the work manager 255. Both kinds of information are included in the order message 330 (310). When the work manager 255 received the work data from the service manager 240 in the order message 330 (310), obtaining the work data 335 from the service data repository is optional.

The work manager 255 can respond 340 to the service manager 240 for an order received previously 330. The work manager 255 can include information identifying the order in the response sent 340 to the service manager.

The service manager 240 can also respond 345 to the AC 260 for the order received 310. When responding 345 to the AC, the service manager 240 can send to the AC information identifying the order, which may have been received 310 from the AC initially, or generated by the service manager 240.

In an embodiment, an execution order can proceed as follows. An execution condition can be indicated or specified in an order message 330 (310), and if an order message indicates that the order should be executed immediately, the execution condition can be considered to be met upon receiving the order message.

A work manager 255 can verify an execution condition and determine if the condition is met or satisfied. An execution condition can therefore be resolved by the work manager 255. The work manager 255 can also generate and allocate a differentiator (e.g. an ID), to identify an execution of the order, due to the execution condition being met. If an execution condition is met multiple times, a different differentiator can be generated each time. Each time an execution condition is met, a different execution of the order can be triggered 350, as described in further steps. A differentiator can identify the execution of an order from other executions of the order. In some embodiments, when the order is a work order, the differentiator identifies an execution of the work.

The work manager 255 can notify the AC that an order, e.g. the order in 330, is to be executed, by sending a notification message 355 to the AC 260 via the service manager 240. The notification message can be sent to the service manager 240, which can forward 360 the notification message to the AC 260. The notification message can include an order ID that identifies the order, and it can also include a differentiator that identifies the execution of the order.

An execution notification 355 (360) can be an early notification in that it can be sent before an order is executed. In some embodiments, the work manager 255 can perform this step only if the AC 260 has requested, or subscribed to, an early notification 360 (355). A request or subscription can be included in work data, or in an order message 310. If a request or subscription is included in work data, information about the subscription can be part of a service profile and be stored in a service data repository.

In an embodiment, the work manager 255 can execute an order 365 after an execution notification is sent 355.

In an embodiment, an execution notification can be a late notification 370 (375), in that it can be sent after an order is executed, instead of before. In some embodiments, the work manager 255 can perform this step only if the AC 260 has requested, or subscribed to, a late notification 375. A request or subscription can be included in work data, or in an order message 310. If a request or subscription is included in the work data, information about the subscription can be part of a service profile and be stored in a service data repository 265.

Figure 4:
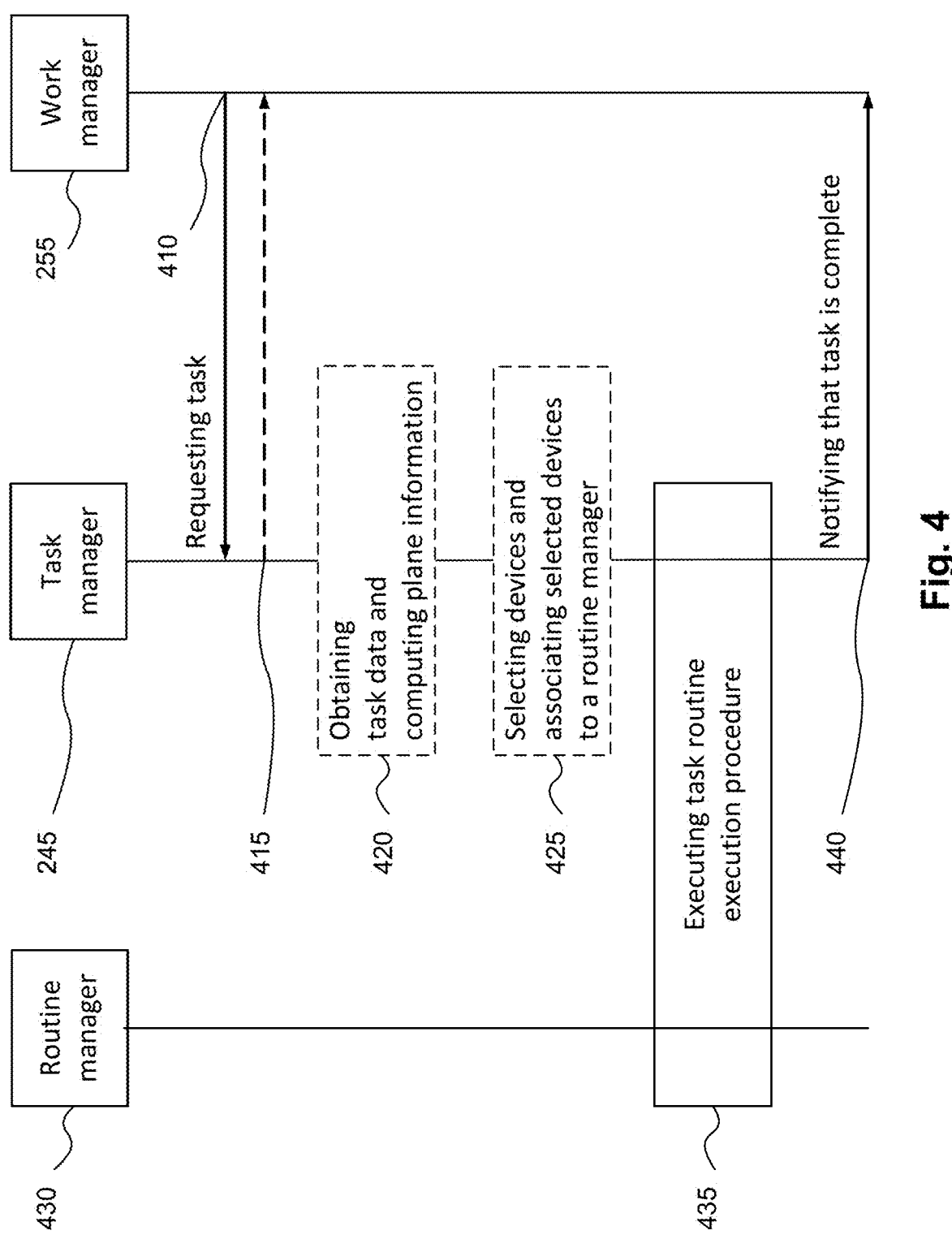
FIG. 4 illustrates a task execution procedure, according to an embodiment.

If an initial order 310 is a task order, the work manager 255 can select a task manager to manage the task, and trigger the task manager to execute the task identified in the task order 310 via a task execution procedure described with FIG. 4. The task order 310 can include information similar to information that would be included with a work order, and when triggering a task manager to execute the task, the work manager 255 can include that information in a task request 410 sent to the task manager.

If an initial order 310 is a work order, the work manager 255 can identify the tasks included in the work identified in the work order, from the work data. For each task, the work manager 255 can select a task manager to manage the task and trigger the task manager to execute the task via the task execution procedure described with FIG. 4. When triggering the task manager to execute the task, the work manager sends a task request 410 to the task manager. In some embodiments, the work manager selects a same task manager for all these comprising tasks of the work. A task execution procedure is illustrated in FIG. 4.

If a work includes multiple tasks, the work manager 255 can trigger an execution of the multiple tasks with respect to inter-task dependency information, as indicated in the work data. The work manager 255 can trigger the execution of inter-dependent tasks in sequence. That is, the work manager 255 can trigger the execution of a first task that depends on a second task (as indicated by the inter-task dependency information), after the second task has been executed. In some embodiments, the work manager 255 can trigger a parallel (e.g. at the same time) execution of tasks having no inter-dependency, as indicated in the inter-task dependency information.

When selecting a task manager to manage a task, the work manager 255 can use information (e.g. information identifying the computing service, information identifying the work, and information identifying the task), in an order message 330, or in the work data 335, to select a task manager. The work manager 255 can select a task manager according to a local configuration, and the task manager can be pre-configured to be selected as indicated in the local configuration. When selecting a task manager, the work manager 255 can consider the load of the task manager. In some embodiments, the load of a task manager can be reflected by the number of tasks being managed by the task manager.

FIG. 4 illustrates a task execution procedure, i.e. a procedure of executing a task, according to an embodiment. The procedure can be initiated by a work manager 255 when the work that the task belongs to is being executed or when certain execution conditions are met. In this procedure, the work manager 255 has the work data associated with the work. The work data can be received by the work manager from a service data repository 265, or from the service manager 240.

The work manager 255 can send a task request 410 to a selected task manager 245, to trigger an execution of a task. The task request 410 can be referred to as a task order. The task manager 245 can respond 415 to the work manager, indicating receipt of the request. Alternatively, the work manager can send a task update request to the task manager to trigger an update to an existing execution of the task, and the task manager can respond to the work manager by indicating receipt of the task update request. The request 410 sent to the task manager 245 can include the following information: information identifying the task (e.g. task ID), information identifying the work to which the task belongs (e.g. work ID), and information identifying the computing service the task is associated with (e.g. service ID).

The request 410 can further include information (e.g. an order ID) identifying an order (either a work order or a task order sent 310 from an AC 260) that the task request is associated with. A task execution can be part of an order execution, and an order can be received by the work manager 255 from an AC 260 via a service manager 240.

In some embodiments, the request 410 can include a differentiator, which is information differentiating the order execution (i.e. the execution to which a task execution belongs) from other executions of the same order. A differentiator can be generated by the work manager 255, and identifies an execution of the work that the task belongs to.

The request 410 may indicate that some devices, which are associated with one or multiple routines of the task, join/participate or leave the execution of the task. In this case, the request 410 includes any of the following: information identifying the one or multiple routines, information identifying the devices, and indication whether the devices join/participate or leave the execution of the task. This information can collectively be referred to as device participation information.

The devices indicated in the device participation information can include devices that have requested to access a work that the task is associated with via a service request procedure. During a service request procedure, a device can send a service request to the service manager. The service request can include information identifying the device, information identifying the computing service, information identifying the work, and more. The service manager can authorize the request and notify the work manager 255 that the device seeks access to the work. The work manager 255 can then identify, from or based on the work data associated with the work, the task and the one or multiple routines, and include the information identifying the device and the information identifying the one or multiple routines in the request 410 sent to the task manager 245.

A task manager 245 can obtain 420 task data associated to a task, routine data associated with routines of the task, and compute plane data related to the task. This step is optional, in particular if the task manager has obtained these data, e.g. in an earlier step, or has been pre-configured with these data.

In some embodiments, the compute plane data related to the task can include compute plane data associated with a computing service, the task being associated with the computing service. In some embodiments, the compute plane data related to the task can include a subset of the compute plane data associated with a computing service (the task being associated with the computing service), and be related only to the routines of the task.

A task manager 245 can obtain 420 task data, routine data and/or compute plane data from a service data repository 265. To do so, the task manager 245 can provide the information identifying the computing service and the information identifying the task, to the service data repository 265, which can send the corresponding task data, routine data and/or compute plane data to the task manager 245.

In some embodiments, the task data, routine data, and/or compute plane data can be included in a task request 410 sent from a work manager 255. In such a case, in order to send these data to the task manager, the work manager 245 can obtain the task data, routine data and/or compute plane data from a service data repository 265. To do so, the work manager 255 can provide the information identifying the computing service and the information identifying the task, to the service data repository 265, and the service data repository 265 can send the corresponding task data, routine data and/or compute plane data, to the work manager 255.

The task data can indicate intra-task dependency, i.e. inter-routine dependency. The task manager 245 can trigger the execution of the routines with respect to the intra-task dependency. That is, for routines that can be executed in parallel, as indicated in the task data, the task manager 245 can trigger their executions in parallel, and for routines that should be executed in sequence, as indicated in the task data, the task manager 245 can trigger their executions in sequence (one after another), following the execution sequence specified in the task data.

The task manager 245 can identify routines included in a task, according to the task data. The task manager 245 can further identify routine managers 425 associated to these routines, according to the compute plane data. Each routine can be associated with one or more routine managers 425. The task manager 245 can trigger the execution of each routine by performing steps as follows.

If a routine is associated with device information, as indicated in the routine data, the task manager 245 can select devices 425 to participate/join in the execution of the routine and associate the selected devices to routine mangers associated with the routine. The routine manager associated with the routine can be indicated in the compute plane data. When selecting devices 425, the task manager 245 can select at least k devices so as to ensure k-anonymity among the devices, wherein the value of k can be indicated in the routine data, or in the task data, or in a local configuration. In some embodiments, when associating the selected devices 245 to the routine mangers, to further ensure k-anonymity the task manager 245 can associate a device to at most one routine manager and associate at least k different devices to a routine manager. If the routine is not associated with device information, this is step is optional. The task manager 245 can select devices 425 according to device information associated with the routine, as included in the routine data, by, for example, selecting devices from the devices indicated in the device information. In some embodiments, the task manager 245 only selects devices that are in a registered status. Device status (e.g. whether registered or not, consensus/agreement) is stored in a network function, which can be the service data repository 265 or be a different network function. The task manager 245 can interact with that network function to identify devices that are in the registered status. In some embodiments, the task manager 245 furthermore only selects devices that have requested, agreed, or consented, e.g. through a service request procedure, to join the work that includes the task to which the routine belongs (i.e. is associated with), as indicated in the device participation information in the request 410. That is, the task manager would furthermore only select devices from those indicated in the device participation information. The request 410 may be a task request or a task update request. In some embodiments, the request 410 is a task update request providing updated device participation information, and the task manager 245 accordingly reselect devices (e.g. include additional device(s)) 425 to participate/join in the execution of the routine. Devices not selected can be removed by the task manager from the execution of the routine if they were previously participating in the execution of the routine.

If multiple routine managers are associated to the routine, the task manager 245 can associate a selected device to one of the routine managers 425, according to device locations, routine manager locations, and/or routine manager service areas. For example, a selected routine manager can be the one that is closest to a device and/or whose service area covers a device's location. Loading of a routine manager can also be considered when determining an association, in order to balance work load among many routine managers.

Figure 5:
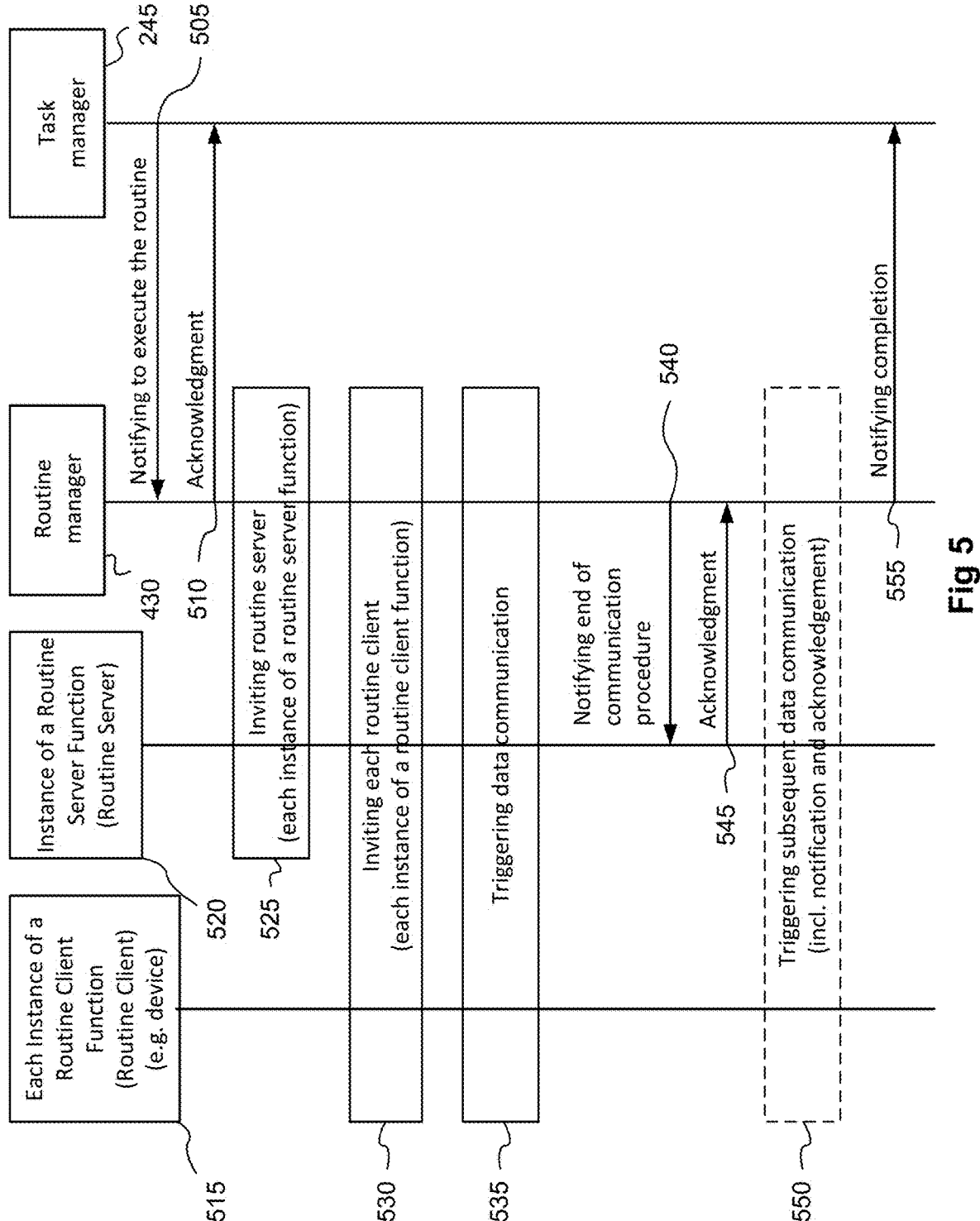
FIG. 5 illustrates a routine execution procedure, according to an embodiment.

The task manager 245 can trigger a routine execution procedure 435 with each routine manager 425, by sending a notification to each routine manager. If the routine manager 430 is associated with device(s) 425, the notification can include information about the device(s), and in some embodiment may further indicate to add the device(s) in the routine execution. The information about the device(s) can include a device ID, a list of device IDs and/or a device group ID. In some embodiments, the notification indicate to remove one or multiple devices from the routine execution, and includes information about the one or multiple devices (e.g. a device ID, a list of device IDs and/or a device group ID). After the routine execution procedure with each of the routine manager(s) is complete, the routine execution finishes, or in other words, the routine is considered executed. A routine execution procedure 435 is illustrated in FIG. 5, which is described further below.

After all the routines of a task have been executed, the task manager 245 can notify 440 the work manager 255 about the task's completion (i.e. completion of the task execution) by sending a notification to the work manager 255. The notification sent to the work manager 255 can include information identifying an order (e.g. an order 310, which may be a work order) and a differentiator identifying an execution of the order. The task execution is associated with or part of the order execution. The notification can further include information identifying the task, and information identifying the computing service. In some embodiments, the task manager 245 does not respond 415 to the work manager and the notification 440 can act as a response to the task request 415.

In embodiments, a routine can be associated with a routine server function and with a routine client function. The routine server function is not for representing devices, while the routine client function may or may not represent devices. An instance of the routine server function can be referred to as a routine server. An instance of a routine client function can be referred to as a routine client. When a routine client function represents devices, it can be associated with information of devices represented by the routine client function for the routine. In this case, the information of devices (i.e. the device information) is associated with the routine and is part of the routine data as described herein, and a device represented by the routine client function can be viewed as an instance of the routine client function (i.e. a routine client).

A routine server can be associated with one or more routine clients. Such an association is for a routine and it can be indicated in the deployment data associated with a computing service, the routine being associated with the computing service. An execution of the routine includes data communications between the routine server and the one or more routine clients. The routine can be associated with one or more routine managers, as indicated in the compute plane data associated with the computing service. One of the one of more routine managers is associated with the routine server and with the one or more routine clients. This routine manager can manage the routine by coordinating data communications between the routine server and the one or more routine clients, during an execution of the routine, as illustrated in FIG. 5.

FIG. 5 illustrates a procedure of execution a routine (i.e. a routine execution procedure), according to an embodiment. In the routine execution procedure, the task manager 245 can be associated with a task to which the routine belongs. In an embodiment, the routine execution can start after the task manager 245 has obtained:

task data associated with the task,
    routine data associated with routines of the task,
    service function data related at least two service functions that the comprising routines are associated with,
    deployment data related to service functions that the comprising routines are associated with, and
    compute plane data related to the task.

The above data can be obtained/received by the task manager 245 from a service data repository or from a work manager. With this data, the task manager 245 can know which routine manager(s) correspond to a routine. The task manager 245 can perform the routine execution procedure in FIG. 5 with each routine manager.

The task manager 245 can notify a routine manager 430 to execute a routine (in other words, to start an execution of the routine), by sending a notification 505 to the routine manager. The notification can include any of: information identifying the computing service (e.g. a service ID), information identifying the routine (e.g. a routine ID), and a synchronization requirement information. The task manager 245 can obtain the synchronization requirement information from the routine data associated with the routine. The notification message 505 can further include information (e.g. an ID) identifying the execution of the routine that the procedure it is associated to (i.e. the routine execution). This information can be referred to as an "execution identifier", "execution ID" or simply "exe ID". The exe ID can be allocated/generated by the task manager 245. In some embodiments, the information identifying the routine is included in the exe ID. The notification message 505 can further include information about devices associated to the routine manager, e.g. when the routine client function represents devices. The devices can be routine clients associated 425 with the routine manager for the routine. This device information can be determined when the task manager 245 selects devices 425 to participate/join in an execution of the routine and associates the selected devices to routine managers associated with the routine.

Then, the routine manager 430 can send an acknowledgment 510 to the task manager 245, indicating recipient of the notification message.

Figure 6:
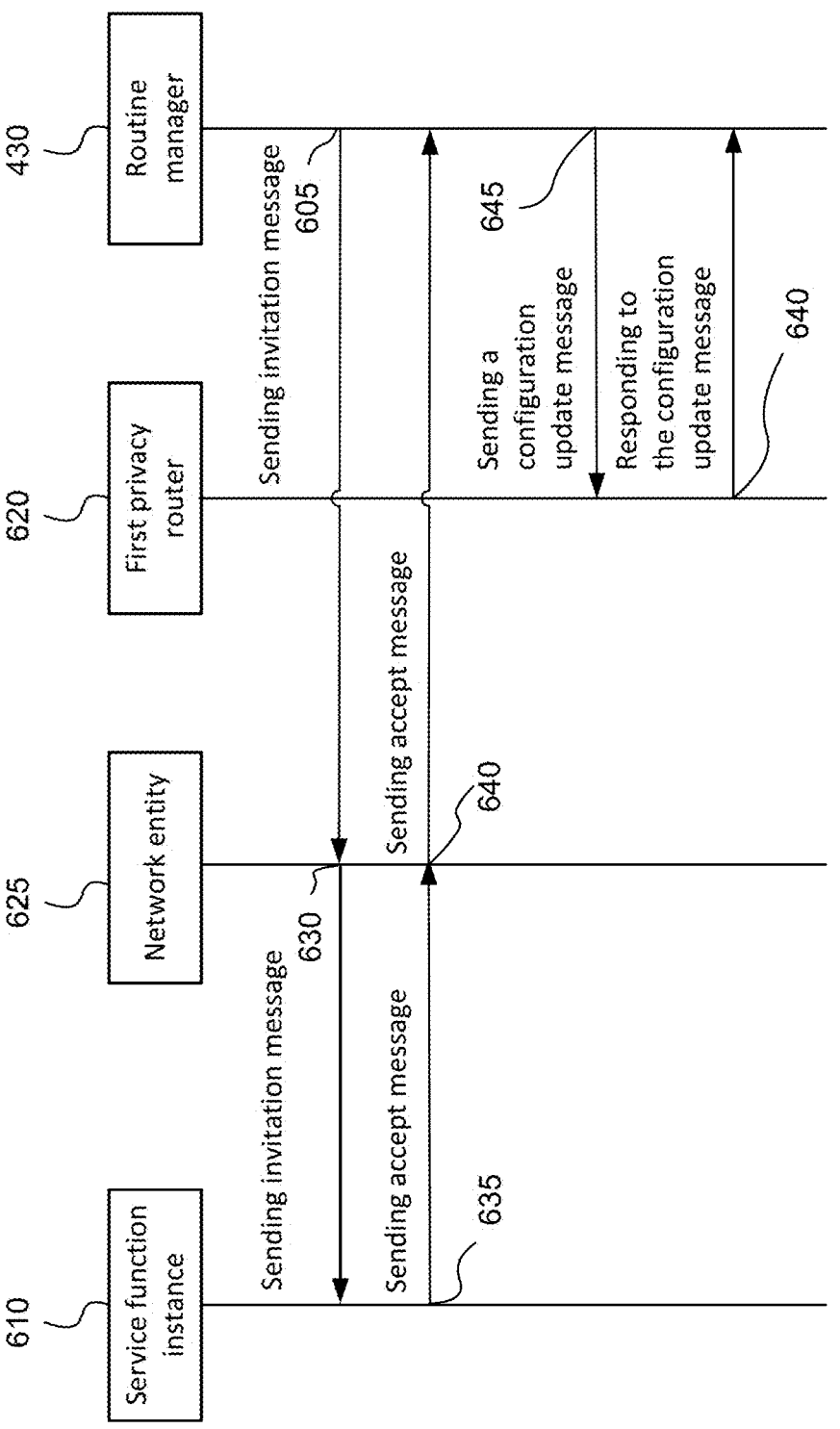
FIG. 6 illustrates a procedure for inviting an instance of a service function into an execution of a routine, according to an embodiment.

In an embodiment, one or more instances of a routine server function 520, i.e. service function instances, or simply "routine servers", can be associated with the routine manager 430, the routine server function being associated with the routine. The routine manager 430 can identify these routine servers 520 and invite 525 each routine server 520 into the routine execution (i.e. to join/participate in or contribute to the routine execution), by performing an invitation procedure 525 with each routine server 520. An invitation procedure 525 is illustrated in FIG. 6, described further below.

In an embodiment, one or more instances of a routine client function 515, i.e. "routine clients", can be associated with the routine manager 430, the routine client function being associated with the routine. The routine manager 430 can identify these routine clients 515 and invite each routine client 515 into the routine execution (i.e. to join/participate in or contribute to the routine execution), by performing an invitation procedure 530 with each routine client 515. An invitation procedure 530 is illustrated in FIG. 6, described further below.

The routine manager 430 can execute the routine by performing the following steps for each instance of the routine server function (routine server) 520.

Figure 7:
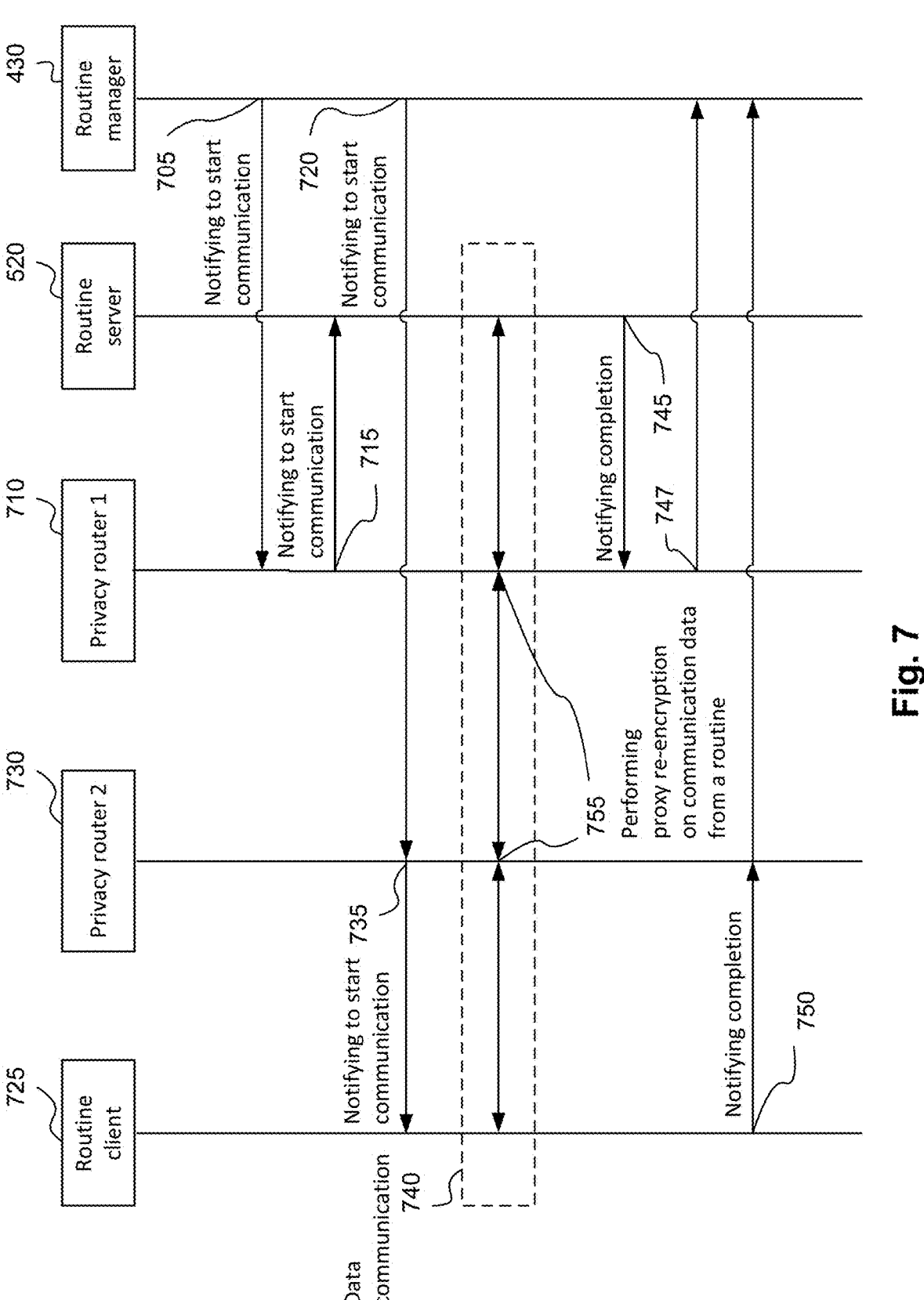
FIG. 7 illustrates a procedure for how a routine server and routine clients can communicate to exchange data, following a trigger from the routine manager, according to an embodiment.

Among the instances of the routine client function (routine clients) 515 that are invited 530, the routine manager 430 can further identify each routine client 515 that is associated with the routine server 520. The routine manager 430 can perform the identifications according to the deployment data. The routine manager 430 can trigger a data communication 535 between the routine server 520 and each routine client 515 associated with the routine server 520, by performing a communication procedure 535 with each routine client 515. FIG. 7 illustrates such a communication procedure 535.

If a synchronization requirement information is included in the task manager's 245 initial notification 505 to the routine manager 430, and the synchronization requirement information indicates a sequential communication, the routine manager 430 can perform the communication procedure 535 for each routine client 515 in sequence (i.e. sequentially or one at a time). If the synchronization requirement information indicates parallel communication instead, the routine manager 430 can perform a communication procedure 535 for each routine client 515 in parallel.

If the task manager's 245 initial notification 505 to the routine manager 430 does not include such a synchronization requirement information, the routine manager 430 can perform a communication procedure 535 for each routine client 515 in sequence or in parallel, either according to a routine manager's 430 determination, or according to a local configuration.

In a case of sequential communication, when a routine manager 430 is performing a communication procedure 535 for a first routine client 515, it does not necessarily start a communication procedure 535 for a second routine client 515, until the communication procedure 535 for the first routine client is finished. A notification from the first routine client 515 and/or from the routine server 520 can indicate such a completion, and FIG. 7 includes such a completion notification.

After the routine manager 430 has performed a communication procedure 535 for each routine client 515, the routine manager 430 can notify 540 the routine server 520.

This notification 540 can imply that no additional routine clients 515 will join in the routine execution. The notification 540 can include an exe ID that identifies the routine execution.

The routine server 520 can respond to the routine manager 430, by sending an acknowledgement (ACK) message 545 to the routine manager 430. The ACK message can include the exe ID.

The ACK message 545 can also indicate to continue or restart the routine execution, e.g. by either including an indication to continue, or by omitting an indication that the routine execution is finished.

The ACK message 545 can also indicate that a routing execution is finished, e.g. by either including an indication that the routine execution is finished, or by omitting an indication that the routine execution is finished.

In some embodiments, an indication to continue and an indication that the routine execution is finished can be included in a same information element of the ACK message 545. The indications can be implemented as two different values of the information element. In some embodiments, the two indication elements are not both present in a message at the same time.

If the ACK message 545 indicates to continue or restart the routine execution, another data communication procedure can be triggered 535 and be followed by another notification 540 and another acknowledgement 545, and this can be repeated 550.

By receiving an acknowledgement 545, the routine manager 430 can know that the routine execution at a routine server 520 is complete. After knowing the routine execution is complete at each routine server 520, the routine manager 430 can notify the task manager 245 about the completion of the routine execution, by sending a notification 555 to the task manager 245. The notification can include any of the following: the information identifying the computing service, the information identifying the routine, and the exe ID.

FIG. 6 illustrates a procedure for inviting an instance of a service function to an execution of a routine, according to an embodiment. As an initial step, a routine manager 430 that is associated with the routine can invite the instance of the service function (i.e. the service function instance) 610 into the execution of the routine (i.e. to joint in/participate in/contribute to the execution of the routine), according to an embodiment. The routine can be associated with a computing service, and the service function instance 610 can be an instance of a service function, for example "service function 2", that is associated with the routine. A first privacy router 620 can be associated with an instance of another service function, for example "service function 1", that is also associated with the routine. The two service function instances, service function 1 and service function 2, can be associated with each other for the routine.

In an embodiment involving the service function 1 and the service function 2, when the service function 2 does not represent devices, a network entity 625 can be a privacy router associated with the service function instance 610 for the routine. In this case, the first privacy router 620 can be coupled with the network entity via a connection T8 242 for the routine.

In an embodiment involving the service function 1 and the service function 2, when the service function 2 does represent devices, then the service function instance 610 is a device, and the network entity 625 is an access node serving the device. In this case, the first privacy router 620 can be coupled with the network entity 625 via an interface T2 209 for the routine.

In the procedure of FIG. 6, the routine manager 430 can invite 605 the service function instance 610 to join in (i.e. participate in, or contribute to) the routine execution, by sending an invitation message 605 to the service function instance 610. The invitation message 605 can be sent via the network entity 625. The invitation message 605 can include any of the following: information identifying the computing service, information identifying the routine, an exe ID identifying the routine execution.

In an embodiment, whether the service function 2 represents devices or does not represent devices, the sending of a message by the routine manager 430 and by an instance of the service function instance 610 can be facilitated with a privacy router, for example, privacy router 620, 710, 730, 230.

In some embodiments, when sending the invitation message 605, the routine manager 430 can include the invitation message 605 in an outer message and send the outer message to the network entity 625. After receiving the outer message from the routine manager 430, the network entity 625 can retrieve the invitation message 605 from the outer message and send 630 the invitation message to the service function instance 610.

In a case where the service function 2 does not represent devices, the outer message can include T8 routing information related to the first privacy router 620. The T8 routing information can describe how to communicate with the first privacy router 620 over a connection T8 242. The network entity 625 can use the T8 routing information to send data or signals received from the service function instance 610 to the first privacy router 620.

In a case where the service function 2 does represent devices, the outer message can include T2 routing information related to the first privacy router 620. The T2 routing information can describe how to communication with the first privacy router 620 over a T2 connection 209. The network can use the T2 routing information to send data/signal received from the service function instance 610 to the first privacy router 620. In this case, the outer message can be sent to the network entity 625 via an access manager serving the service function instance 610 (i.e. the device).

The T2 and T8 routing information described above can include any of the following information related to the first privacy router 620: a network address, a port number, a protocol type, a tunnel end point ID, a tunnel ID, and more. In some embodiments, the T2 and T8 routing information can be generated by the first privacy router 620 and be provided by the first privacy router to the routine manager 430 in a separate procedure.

The service function instance 610 can send an accept message 635 in response to the invitation message 630. The accept message 635 can indicate that the service function instance 610 accepts the invitation, i.e. agrees to join in (i.e. participate in, or contribute to) the routine execution. The accept message 635 can be sent to the network entity 625, and the network entity can send/forward 640 the accept message to the routine manager 430.

The accept message 635 (640) can further include security materials, e.g. re-encryption key, for performing proxy re-encryption, for example, when the service function instance 610 is a device. The security materials can be used to re-encrypt data intended for the service function instance 610, before sending or forwarding the data to the service function instance 610. The service function instance 610 can include the security materials in the accept message 635, if the routine manager 430 indicates with its initial invitation 605 that proxy re-encryption is to be performed during data communication.

In some embodiments, the network entity 625 can send/forward the accept message 640 by including it in an outer message and sending the outer message to the routine manager 430. After receiving the outer message, the routine manager 430 can retrieve the invitation message from it.

In a case where the service function 2 does not represent devices: the network entity 625 can include T8 routing information related to itself in the outer message. The T8 routing information can describe how to communicate with the network entity 625 over a connection T8 242.

In a case where the service function 2 does represent devices, the network entity 625 can include T2 routing information related to itself in the outer message. The T2 routing information can describe how to communicate with the network entity 625 over a T2 connection 209. In this case, the outer message can be sent to the routine manager via an access manager serving the service function instance (i.e. device) 610. The access manager may be the same one involved with the initial invitation 605 of the routine manager 430.

The T2 and T8 routing information described above can include any of the following info related to the network entity: a network address, a port number, a protocol type, a tunnel end point ID, a tunnel ID, etc. In some embodiments, the T2 and T8 routing information can be generated by the network entity 625.

The routine manager 430 can provide the T2 and T8 routing information received with the accept message 640, to the first privacy router 620, by sending a configuration update message 645 to the first privacy router 620. The configuration update message 645 can include T2 and T8 routing information. Subsequently, the first privacy router 620 can use the T2 and T8 routing information to send data/signal received from the associated instance of the service function 1, to the network entity 625, which can then send it to the service function instance 610. If the accept message 635 and 640 includes security materials, in some embodiments, the routine manager includes the security materials in the configuration update message 645. Subsequently, the first privacy router 620 can use the security materials to perform data re-encryption, i.e. to re-encrypt data intended for the service function instance 610, before sending or forwarding the data to the service function instance 610.

The first privacy router 620 can respond to the routine manager 430, by sending a configuration update response message 650. The response message 650 can acknowledge the receipt of the configuration update message 645.

In an embodiment, data communication can be triggered between a routine client and a routine server. A routine server can be associated with a privacy router, referred to as privacy router 1, and be connected with the privacy router 1 via a T4 interface/connection 214. A routine client, one of the routine client(s) associated with the routine server, can be associated with a privacy router, referred to as privacy router 2, and be connected with the privacy router 5 either of a T2 connection 209 and a T4 interface/connection 214. Privacy router 1 and privacy router 2 can be the same network entity, for example, when the routine client is a device. When privacy router 1 and privacy router 2 are different network entities, privacy router 1 and privacy router 2 can be associated, and connected via a T8 interface/connection 242, with each other. During an execution of the routine, the routine server and the routine client can com-municate (to exchange data) via the privacy router 1 and the privacy router 2, following a trigger from the routine manager, as illustrated in FIG. 7. The routine is associated with a computing service.

FIG. 7 illustrates how a routine server and a routine client can communicate to exchange data, following a trigger from a routine manager, according to an embodiment.

In FIG. 7, the routine manager 430 can notify the routine server 520 to start a data communication associated with an execution of the routine. The notification can be sent to privacy router 1 710 over an T9b interface 247, which can then forward it 715 to the routine server 520 over a T4 interface 214. The notification 705 (715) can include infor-mation identifying the computing service and information identifying the routine. The notification can further include an exe ID, which can identify the execution of the routine (i.e. the routine execution) and can be generated/allocated by the routine manager 430. In this step, the routine manager 430 can provide/send traffic handling instructions/rules to privacy router 1 710. The traffic handling instructions can indicate how to process and forward data traffic related to the routine execution. The traffic handling instructions can be sent to the privacy router 1 710 together with the notification 705. The privacy router 1 710 can, in accordance with the traffic handling instructions, process and forward data traffic related to the routine execution, as further described below.

The routine manager 430 can notify 720 the routine client 725 to start the data communication. The notification 720 can be sent to the privacy router 2 730 over T9b interface 247, which can then forward it 735 to the routine client 725 over T2 interface 209 or T4 interface 214. The notification 720 (735) can include the information identifying the com-puting service and the information identifying the routine. The notification 720 (735) can further include the exe ID.

In this step, the routine manager 430 can provide/send traffic handling instructions/rules to privacy router 2 730. The traffic handling instructions can indicate how to process and forward data traffic related to the routine execution.

The traffic handling instructions can be sent to privacy router 2 730 together with the notification 720. Privacy router 2 730 can, in accordance with the traffic handling instructions, process and forward data traffic related to the routine execution, as further described below.

The routine server 520 and the routine client 725 can communicate with each other via their associated privacy routers, i.e. privacy router 1 710 and privacy router 2 730. The data communication 740 can be initiated by the routine client 725 or by the routine server 520. In this step, privacy router 1 710 and privacy router 2 730 can process and forward data between the routine server 520 and the routine client 725, as described below, according to the traffic handling instruction received from the routine manager 430 in a previous step, in particular, privacy router 1's and privacy router 2's processing can include performing proxy re-encryption on the communication data from a routine 755.

In some embodiments, the T4 connection 214 between the routine server 520 and the privacy router 1 710, the T8 connection 242 between privacy router 1 710 and privacy router 2 730, and the T2 connection 209 between privacy router 2 730 and the routine client 725, can all be tunnel based. These connections 214, 242 and 209 can be dedicated to the routine execution. The traffic handling instructions received by privacy router 1 710 (together with the initial notification 705) can indicate a mapping between the T4 connection 214 and the T8 connection 242. Privacy router 1 710 can, in accordance with the mapping, forward data received from the T4 connection 214 to the T8 connection 242 and data received from the T8 connection 242 to the T4 connection 214. Traffic handling instructions received earlier (together with the notification 720) by privacy router 2 730 can indicates a mapping between the T2 connection 209 and the T8 connection 242. Privacy router 2 730 according to the mapping, can forward data received from the T2 connection 209 to the T8 connection 242, and data received from the T8 connection 242 to the T2 connection 209.

During data communication 740, in some embodiments, privacy router 1 710 can be configured to, when forwarding data, perform proxy re-encryption on (i.e. re-encrypt) the communication data 755 and send the re-encrypted data. The data can be associated with raw data. The privacy router 1 710 can re-encrypt the data using a re-encryption key related to the intended receiver, either the routine client 725 or the routine server 520, such that the intended receiver can decrypt the re-encrypted data to obtain the raw data. The re-encryption key can be pre-configured in privacy router 1 710, or be received from the routine manger 430 as part of the traffic handling instructions. Privacy router 1 710 can be configured to do as described previously, for data being transported to the routine server 520 (which is associated with the privacy router 1 710). The privacy router 2 730 can be configured likewise, but for data being transported to the routine client 725, which is instead associated with privacy router 2 730. Therefore, in an embodiment, privacy router 1 710 and privacy router 2 730 can each perform proxy re-encryption 755 on the communication data from the routine (i.e. the data being communicated via the routine) in different directions. In other words privacy router 1 710 re-encrypts the communication data towards the routine client 725 and privacy router 2 730 also re-encrypts the communication data towards the routine server 520. Each of privacy router 1 710 and privacy router 2 730 then sends the re-encrypted data to the other privacy router (i.e. privacy router 1 710 sends to privacy router 2 730 and vice versa). In some embodiments, the communication data is re-encrypted only once, either by the privacy router 1 710 or by the privacy router 2 730.

The routine server 520 can send a notification 745 to the routine manager 430 about completion of the data communication 740 when the data communication with the routine client finishes. In an embodiment, the completion notification 745 can be sent to privacy router 1 710, which can then forward it 747 to the routine manager 430. The completion notification 745 can include any of the following: information identifying the computing service, information identifying the routine, and the exe ID identifying the routine execution. In an embodiment, the completion notification 745 can be optional.

The routine client 725 can send a notification 750 to the routine manager 430 about the completion of the data communication 740, for example, when the data communication 740 with the routine server finishes. This completion notification 750 can include any of the following: information identifying the computing service, information identifying the routine, and the exe ID identifying the routine execution. In an embodiment, this notification 745 can be optional.

In an embodiment, a routine client can communicate with a routine server, In some embodiments multiple routine clients can communicate with a same routine server, either in parallel or in sequence, depending on the embodiment. First, a routine manager can invite the routine server and each routine clients. Then the routine manager can trigger a communication between the routine server and one routine client, and then the routine manager can trigger a communication between the routine server and the other routine client, either before or after the first communication, depending on whether the synchronization requirement respectively requires a parallel communication or a sequential communication.

Figure 8:
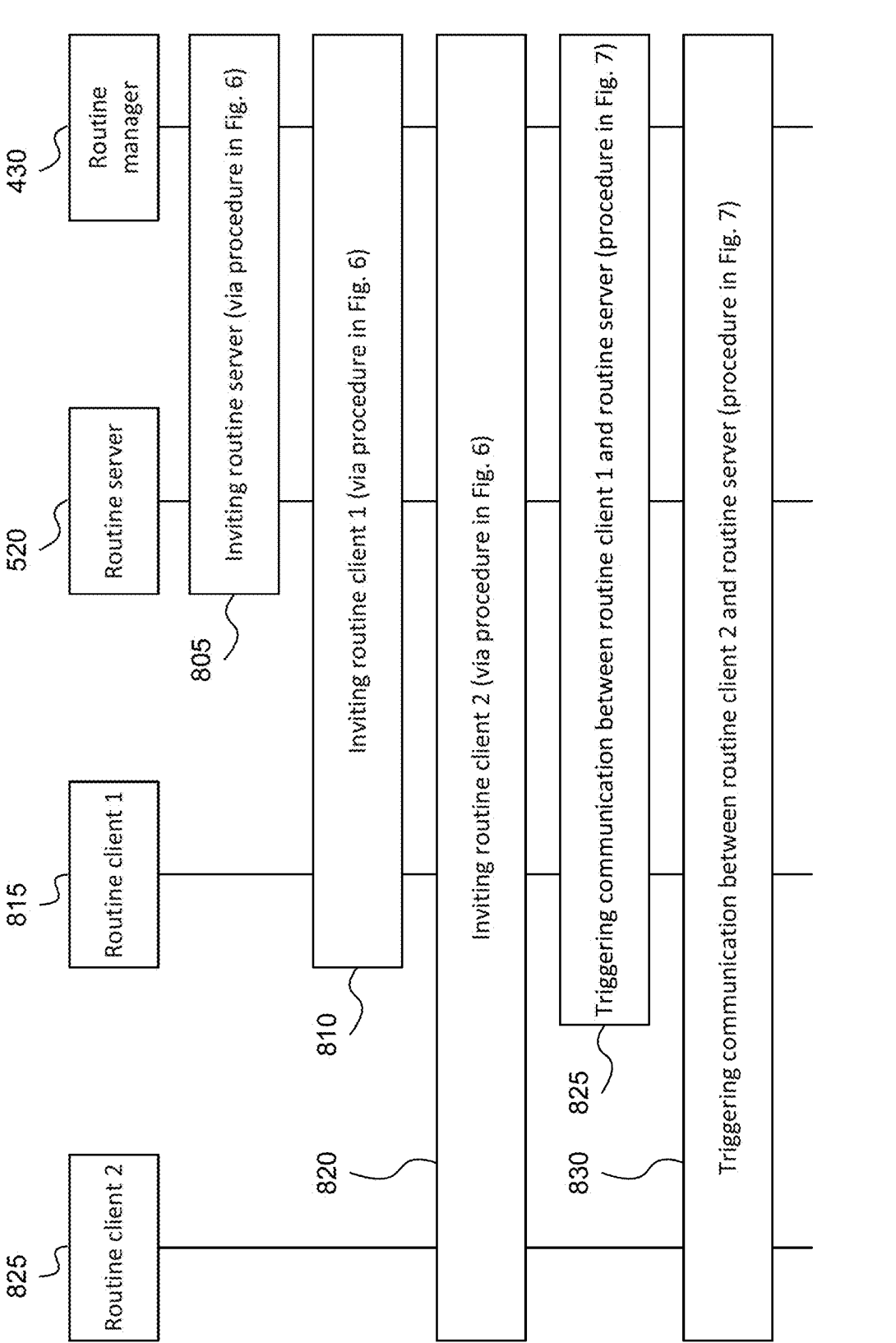
FIG. 8 illustrates a procedure for how a routine manager can invite two routine clients and trigger communication between the routine server and each routine client, according to an embodiment.

FIG. 8 illustrates how two communications can be triggered in sequence or in parallel, one between a server and a first routine client, and the other between the server and a second routine client, according to an embodiment. The routine manager 430 can invite 805 the routine server 520 via the procedure of FIG. 6. The routine manager 430 can also invite 810 a first routine client 815, also via the procedure of FIG. 6. Further, the routine manager 430 can further invite 820 a second routine client 825, via a further use of the procedure in FIG. 6. After the routine server 520, the first routine client 815 and the second routine client 825 have been invited, the routine manager 430 can trigger data communication 825 between the routine server 520 and the first routine client 815. It can also trigger data communication 830 between the routine server 520 and the second routine client 830. Depending on a synchronisation requirement, triggering communication between the routine server and the second routine client can be done before or after the communication between the routine server and the first routine client is complete.

In an embodiment, once a communication channel between a routine server 520 and a routine client has been triggered as in FIG. 8, the routine server 520 and the routine client can exchange data, i.e. communicate data. In an embodiment, this communication can occur through a privacy router associated with the first routine client 815, a privacy router associated with the second routine client 830, and a privacy router associated with the routine server 520. In another embodiment, the privacy router associated with the first routine client 815 and the privacy router associated with the second routine client 830 can be combined or be the same entity. In another embodiment, any of the privacy router associated with the first routine client 815 and the privacy router associated with the second routine client 830 can be combined with the privacy router associated with the routine server 520. In embodiments a privacy router (e.g. any of the privacy router associated with the first routine client 815, the privacy router associated with the second routine client 830, and the privacy router associated with the routine server 520) can re-encrypt communication data, but this can also be optional.

Figure 9:
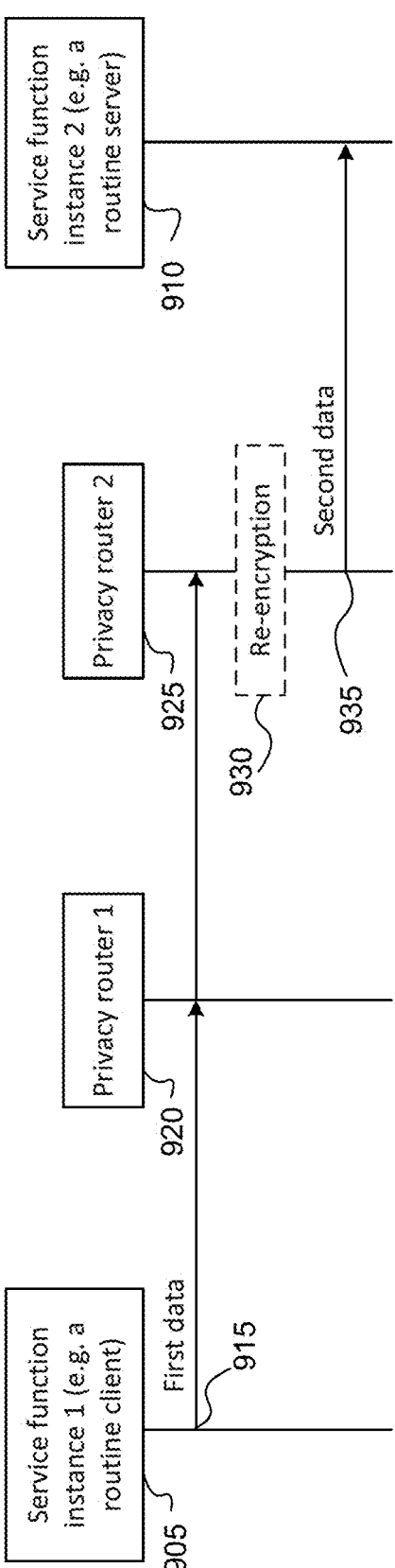
FIG. 9 illustrates a data path between a service function instance 1 and a service function instance 2, where the data is optionally encrypted by a router, according to an embodiment.

FIG. 9 illustrates a data communication channel between an instance of a service function and an instance of another service function. In an embodiment, one of the service functions instances 905 can be a routine client and the other service function instance 910 can be a routine server. Data as sent 915 (i.e. first data) from a service function instance 905 can be communicated to the other service function instance 910 through a first privacy router 920 and in some embodiments, data can also go through a second privacy router 925. In some embodiments, both privacy routers can be combined into one privacy router. In some embodiments, for example, when data 915 is cipher text (i.e. encrypted), the data can be re-encrypted 930 without decryption; in other embodiments, it is not re-encrypted whether the data is cipher text or not. When relayed by a privacy router and optionally re-encrypted, the data can be referred to as second data 935.

In an embodiment, an instance of a service function can be a routine server, an instance of another service function can be a first routine client, and an instance of yet another service function can be a second routine client. This arrangement can allow the routine server to communicate with the first routine client, and with the second routine client, in sequence or in parallel, depending on a synchronization requirement, once communications have been triggered, as per FIG. 8.

Figure 10:
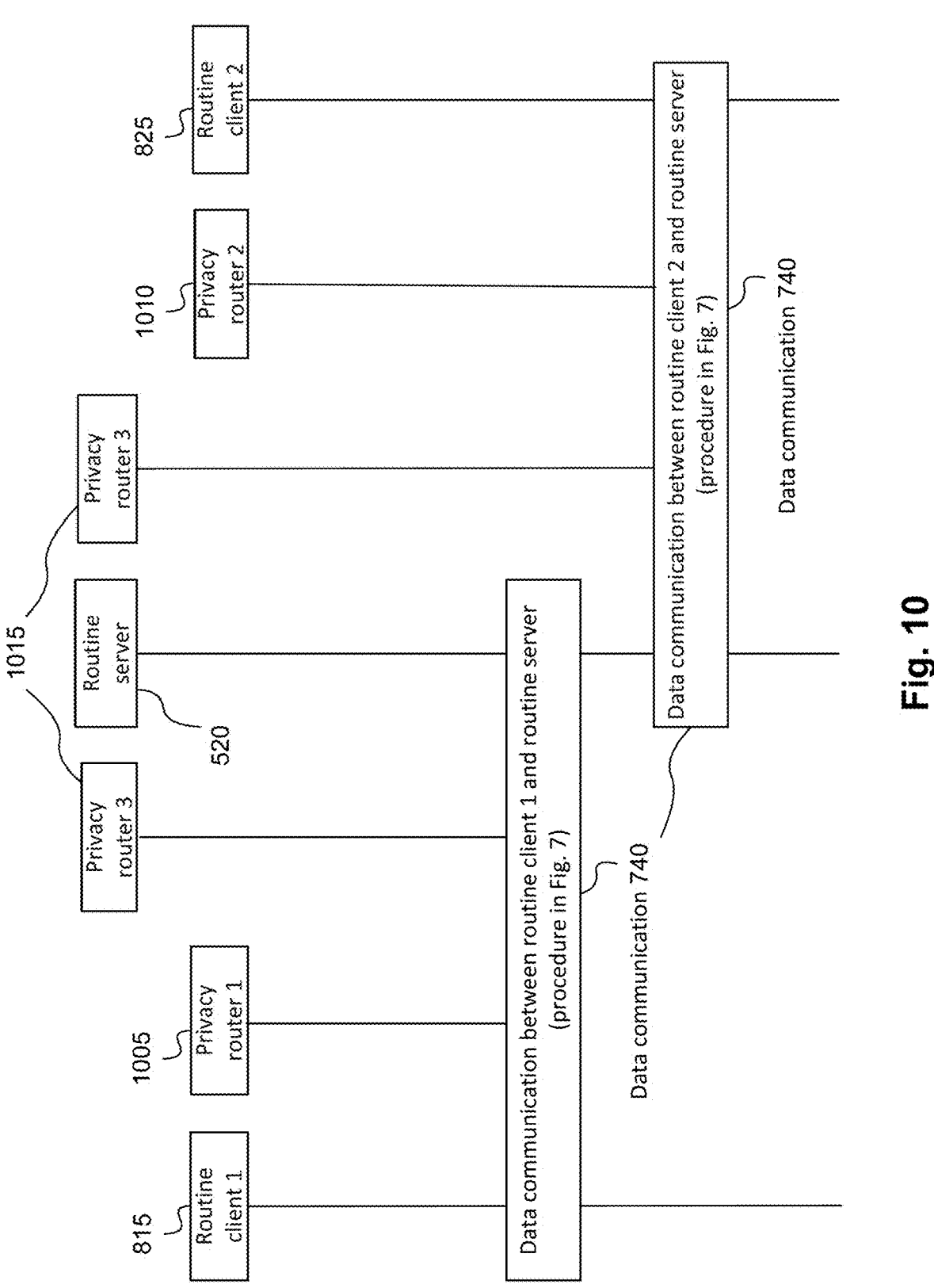
FIG. 10 illustrates a procedure for how communications can occur between a routine server and two routine clients, either in sequence or in parallel, according to an embodiment.

FIG. 10 illustrates how communications can occur between a routine server and two routine clients, either in sequence or in parallel, according to an embodiment. Once the invitation procedure of FIG. 8 has been completed with a routine server 520 for a first routine client 815 and for a second routine client 825, there can be data communication between the routine server 520 and the first routine client 815, as well as between the routine server 520 and the second routine client 825 740. The two communications can be in parallel or in sequence, depending on a synchronization requirement. Data of the data communication can be encrypted with one or more of a first privacy router 1005 associated with the first routine client 815, a second privacy router 1010 associated with the second routine client 825, a third privacy router 1015 associated with the routine server 520. In some embodiments, the first privacy router 1005 and the third privacy router 1015 can be combined into one privacy router. In other embodiments, the second privacy router 1010 and the third privacy router 1015 can be combined into one privacy router. In some embodiments, there can be a plurality of routine clients and a plurality of corresponding privacy routers or combined privacy routers.

Embodiments of a system design can include features of data confidentiality, infrastructure network security.

In an embodiment, infrastructure network security can be improved because deployment locations of service functions are not disclosed to an application provider or an application layer, and because computing parties are able to communicate without knowing about each other.

In an embodiment, compute management can be accomplished through interactions between at least one work manager, at least one task manager, at least one routine manager, at least one service function instance (including devices), and at least one application controller. During compute management, inter-task dependency and intra-task dependency can be respected.

In an embodiment, data can leave the source as cipher text and be re-encrypted by the platform (i.e. a privacy router of the platform), without decryption. The re-encrypted data can be forwarded to the destination, which can then recover the original data. In such a process, the data can remain unreadable to the platform, thereby achieving data confidentiality.

In an embodiment, a system architecture can include a routine manager having the functionality of communicating with a task manager, which in turn can communicate with a work manager, and provides instructions for a routine manager to execute a routine. Optionally, a work manager can communicate with a service manager, which in turn can communicate with an application controller, so that the service manager and application controller can instruct the work manager to execute a work and tasks.

In an embodiment, a device can be any network element, including a user equipment (UE), an internet-of-things (IoT) device, a vehicle, a satellite, and a server, as long as the device can register as a device with a platform of an embodiment, and be recognized as device by a platform of an embodiment.

Figure 11:
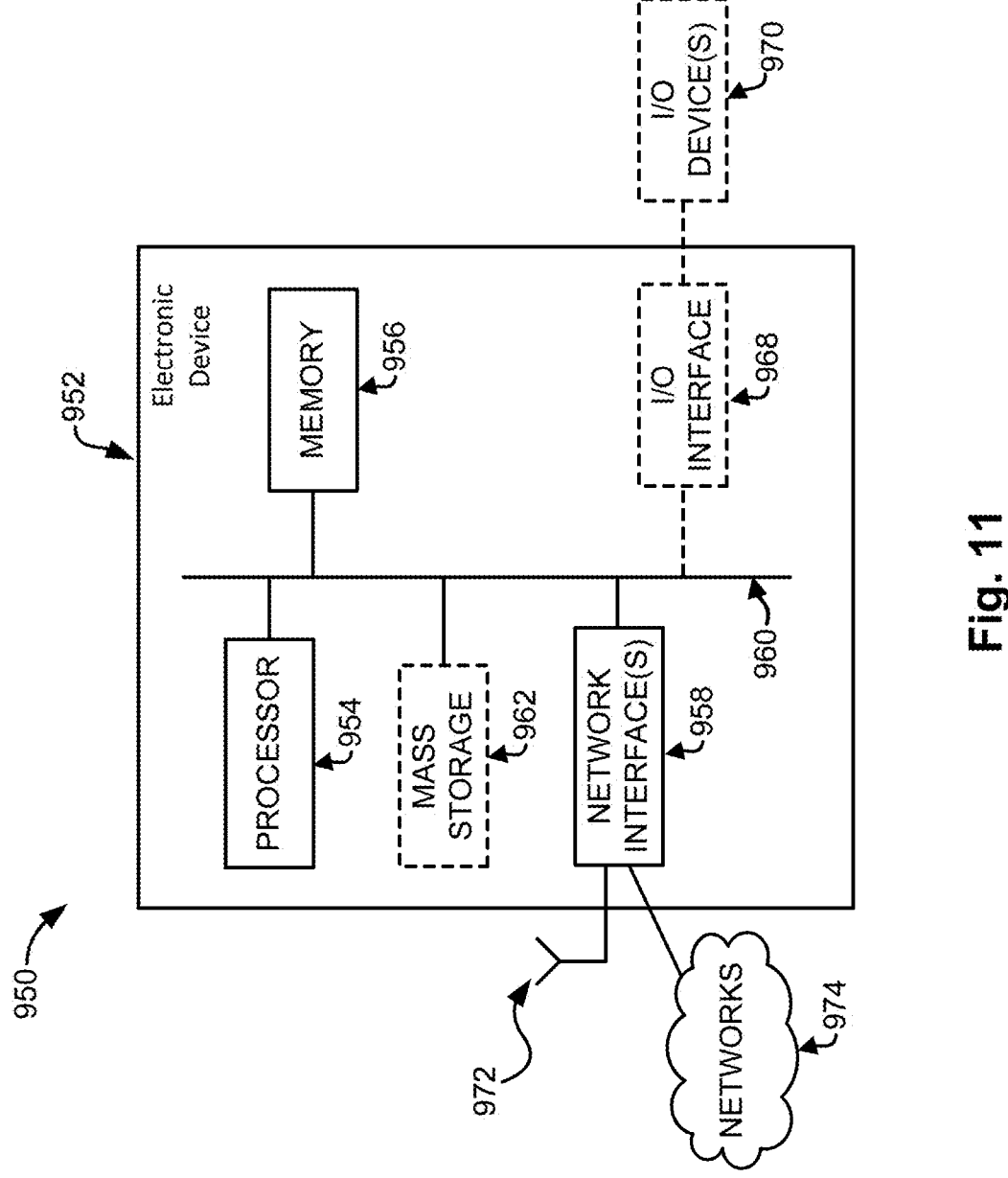
FIG. 11 is a block diagram of an electronic device 952 within a computing and communications environment 950 that may be used for implementing devices and methods in accordance with representative embodiments of the present disclosure, according to embodiments.

FIG. 11 is a block diagram of an electronic device (ED) 952 illustrated within a computing and communications environment 950 that may be used for implementing the devices and methods disclosed herein. In some embodiments, the electronic device 952 may be an element of communications network infrastructure or a user equipment (UE). The electronic device 952 typically includes a processor 954, such as a central processing unit (CPU), and may further include specialized processors such as a graphics processing unit (GPU) or other such processor, a memory 956, a network interface 958 and a bus 960 to connect the components of ED 952. ED 952 may optionally also include components such as a mass storage device 962, a video adapter 964, and an I/O interface 968 (shown in dashed lines).

The memory 946 may comprise any type of non-transitory system memory, readable by the processor 954, such as static random-access memory (SRAM), dynamic random access memory (DRAM), synchronous DRAM (SDRAM), read-only memory (ROM), or a combination thereof. In specific embodiments, the memory 108 may include more than one type of memory, such as ROM for use at boot-up, and DRAM for program and data storage for use while executing programs.

The mass storage 962 may comprise any type of non-transitory storage device configured to store data, programs, and other information and to make the data, programs, and other information accessible via the bus 960. In some embodiments, mass storage 962 may be remote to the electronic device 952 and accessible through use of a network interface such as interface 958. In the illustrated embodiment, mass storage 962 is distinct from memory 946 where it is included, and may generally perform storage tasks compatible with higher latency, but may generally provide lesser or no volatility. In some embodiments, mass storage 962 may be integrated with a memory 946 to form an heterogeneous memory.

In some embodiments, electronic device 952 may be a standalone device, while in other embodiments electronic device 952 may be resident within a data center. A data center, as will be understood in the art, is a collection of computing resources (typically in the form of servers) that can be used as a collective computing and storage resource. Within a data center, a plurality of servers can be connected together to provide a computing resource pool upon which virtualized entities can be instantiated. Data centers can be interconnected with each other to form networks consisting of pools computing and storage resources connected to each by connectivity resources. The connectivity resources may take the form of physical connections such as Ethernet or optical communications links, and may include wireless communication channels as well. If two different data centers are connected by a plurality of different communication channels, the links can be combined together using any of a number of techniques including the formation of link aggregation groups (LAGs). It should be understood that any or all of the computing, storage and connectivity resources (along with other resources within the network) can be divided between different sub-networks, in some cases in the form of a resource slice. If the resources across a number of connected data centers or other collection of nodes are sliced, different network slices can be created It should be appreciated that the network functions such as the privacy routers, task, work and routine managers and the routine clients and servers can all be instantiated within one or more electronic devices. Accordingly embodiments include an electronic device including a processor, and machine readable memory, storing machine executable instructions which when executed by the processor, cause the electronic device to implement the methods disclosed herein. Further a system of electronic devices and/or data centers can be used to implement the methods disclosed herein.

Embodiments include a system operative to execute a computing service, the computing service comprising at least one routine and at least one service function, each routine associated with a routine server function and a routine client function, the system comprising: at least one routine manager operative to execute a routine and configured for: receiving a synchronization requirement associated with the routine; inviting a first routine client, according to the synchronization requirement, the first routine client being an instance of the routine client function, to perform a first data communication with a routine server, the routine server being an instance of the routine server function; inviting a second routine client, according to the synchronization requirement, the second routine client being an instance of the routine client function, to perform a second data communication with the routine server; at least one first privacy router operative to forward data traffic associated with the first data communication between the routine server and the first routine client; at least one second privacy router operative to forward data traffic associated with the second data communication between the routine server and the second routine client. In embodiments, a synchronization requirement can be for sequential communication, and inviting the second routine client can performed before the first data communication. In embodiments, a synchronization requirement can be for parallel communications and inviting the second routine client to perform the second data communication with the routine server, can occur prior to the completion of the first data communication. In embodiments, inviting the second routine client further comprises receiving a notification about the completion of the first data communication. In embodiments, a privacy router can receive from the routine manager instructions indicating to perform proxy re-encryption on the data traffic, and performs accordingly. In embodiments, the first privacy router and the second privacy router can be the same entity. In embodiment, at least one routine client can be a terminal device. In embodiments, the synchronization requirement can include information identifying at least one of the routine client function and the routine server function. In embodiments, routines and service functions of the computing service can be grouped into at least one task, and the system can further comprise at least one task manager, the task manager configured to be interfaced to communicate with at least one routine manager, and operative to receive an order to execute a task; coordinate the execution of routines of the task, in accordance with inter-routine dependency and; allocate an execution identifier to each routine execution; identify at least one routine manager associated with each routine; and notify the routine manager to execute the routine. In embodiments, tasks can be grouped into works, and the system can further comprise a work manager, the work manager configured to be: interfaced to communicate with at least one task manager, and operative to: receive an order to execute a work; coordinate the execution of tasks of the work, in accordance with inter-task dependency; select at least one task manager to execute the tasks of the work; and send each task order to a selected task manager. In embodiments, the computing service can comprise works, and the system can further comprise a service manager, the service manager configured to be interfaced to communicate with at least one work manager, and operative to receive work orders; select a work manager for each work order, considering the workload of each work manager;

allocate information identifying each work order; allocate information identifying the execution; send the information to a selected work manager; forward identified work orders and to selected work managers; and trigger an execution of a work associated with the service. In embodiments, the service manager can be further operative to obtain inter-task dependency data associated with a work; and provide inter-task dependency data to a work manager. In embodiments, a system can further comprising an application controller, interfaced to communicate with the service manager, and operative to manage the computing service by interacting with the service manager, including: sending a work order to a service manager, and receiving a notification that the execution of a work order is complete. In embodiments, a system can further comprise at least one service data repository, interfaced to communicate with at least the service manager, a work manager, and a task manager, and operative to receive, store and send information including: information identifying each computing service, a service profile for each computing service, information identifying each work, work data, task data, routine data, compute plane data, service function data, and deployment data. In embodiments, the at least one service data repository can be further operative to receive, store and send information including user subscription data. In embodiments, the at least one service data repository can be further operative to receive, store and send information including device status information.

Embodiments include a method of executing a computing service, comprising: coordinating, with a routine manager, the execution of a plurality of routines which form the computing service, in accordance with respective inter-routine dependency; wherein the execution of a routine includes: performing proxy re-encryption on communication data from the routine, forwarding communication data from the routine. In embodiments, coordinating the execution of a routine can includes triggering the execution of a routine, which can comprise: including in a first notification, information identifying the computing service and information identifying the routine; sending the first notification to a privacy router configured for processing the data related to routine execution and forwarding a second notification to an instance of a routine server function; including in a third notification, information identifying the computing service and information identifying the routine; sending the third notification to a privacy router configured for processing the data related to routine execution and forwarding a fourth notification to an instance of a routine client function; wherein at least one privacy router is further configured to initiate a communication between the instance of a routine server function and the instance of a routine client function, in accordance with communication instructions; and processing the data related to routine execution is performed in accordance with communication instructions. In embodiments, the communication instructions can be included in a notification to a privacy router. In embodiments, processing the data related to routine execution can further comprise performing proxy re-encryption on the data by using a re-encryption key related to the receiver of the data. In embodiments, a re-encryption key can be pre-configured in the privacy router. In embodiments, a re-encryption key can be received from the routine manager as part of the communication instructions. In embodiments, a routine manager can receive from the instance of a routine server function, a notification that a data communication is completed. In embodiments, a routine manager can receive from an instance of a routine client function, a notification that a data communication is completed. In embodiments, coordinating the execution of a routine can further include: sending, by the routine manager to a first instance of a service function, a first invitation message; sending, by the routine manager to a second instance of a service function, a second invitation message; receiving, by the routine manager from the first instance of a service function, a first accept message that includes security material for performing proxy re-encryption of the routine's communication data; and receiving, by the routine manager from the second instance of a service function, a second accept message that includes security material for performing proxy re-encryption of the routine's communication data; wherein the sending of each message is facilitated with a privacy router. In embodiments, an invitation message can further include: information identifying the computing service, information identifying a routine, information identifying a routine execution. In embodiments, sending an invitation message can further comprise sending an outer message that includes the invitation message. In embodiments, an outer message can further include routing information related to a privacy router. In embodiments, coordinating the execution of a routine can include: receiving a notification, by the routine manager, from a task manager having obtained information associated with a service profile of the computing service, to execute the routine; sending an acknowledgment, from the routine manager to the task manager; sending an invitation, from the routine manager to an instance of a routine server function, to contribute to the routine execution; sending an invitation, from the routine manager to at least one instance of a routine client function, to contribute to at least one routine execution; executing, by the routine manager, a routine communication procedure with each instance of a routine client function. In embodiments, coordinating the execution of a routine can further include: executing at least one routine, by at least one routine manager, based on data obtained by a task manager, including data allowing the selection of the at least one routine manager; routine data associated with the at least one routine; task data associated to a task; compute plane data related to a task; and a request from a work manager, to trigger the task that includes the at least one routine. In embodiments, a work manager can be selected by a service manager, receive a work order from the service manager, receive work data associated with the work, receive information as to how to execute the work, and receive at least one execution condition. In embodiments, a task manager can further be operative to select at least a number k of devices so as to ensure k-anonymity among the devices, wherein the value of number k can be indicated in the routine data, task data or in a local configuration. In embodiments, a task manager can further be operative to select devices, associate the devices to routine managers, and notify the routine managers about the devices, such as to allow the routine manager to invite the devices.

Embodiments have been described above in conjunction with aspects of the present invention upon which they can be implemented. Those skilled in the art will appreciate that embodiments may be implemented in conjunction with the aspect with which they are described, but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

The invention claimed is:

1. A system operative to execute a computing service, the computing service comprising at least one routine and at least one service function, each routine associated with a routine server function and a routine client function, the system comprising:
   (i) at least one routine manager operative to execute a routine and configured for:
      receiving a synchronization requirement associated with the routine;
      inviting a first routine client, according to the synchronization requirement, the first routine client being associated with an instance of the routine client function, to perform a first data communication with a routine server, the routine server being an instance of the routine server function; and
      inviting a second routine client, according to the synchronization requirement, the second routine client being associated with an instance of the routine client function, to perform a second data communication with the routine server;
   the at least one routine manager further operative to co-ordinate the execution of the routine including:
      sending a first notification to a privacy router configured for processing data related to routine execution, the processing comprising performing proxy re-encryption on the data by using a re-encryption key related to a receiver of the data and forwarding re-encrypted data from the routine, and
      forwarding a second notification to an instance of a routine server function, wherein the first notification includes:
         information identifying the computing service and information identifying the routine;
      sending a third notification to a privacy router configured for processing the data related to routine execution, the processing comprising performing proxy re-encryption on the data by using a re-encryption key related to the receiver of the data and forwarding re-encrypted data from the routine; and
      forwarding a fourth notification to an instance of a routine client function, wherein the third notification includes:
         information identifying the computing service and information identifying the routine;
      wherein at least one privacy router is further configured to initiate a communication between the instance of a routine server function and the instance of a routine client function, in accordance with communication instructions; and
      wherein processing the data related to routine execution is performed in accordance with communication instructions; and
   (ii) at least one first said privacy router being operative to forward data traffic associated with the first data communication between the routine server and the first routine client; and (iii) at least one second said privacy router being operative to forward data traffic associated with the second data communication between the routine server and the second routine client.

2. The system of claim 1 wherein:

the synchronization requirement is for sequential communication, and the second data communication occurs after completion of the first data communication.

3. The system of claim 1 wherein:

the synchronization requirement is for parallel communications, and inviting the second routine client to perform the second data communication with the routine server, occurs prior to the completion of the first data communication.

4. The system of claim 1 wherein:

the synchronization requirement is for parallel communication, and the second data communication occurs prior to the completion of the first data communication.

5. The system of claim 1, wherein the at least one privacy router receives, from the routine manager, instructions indicating to perform proxy re-encryption on the data traffic, and performs accordingly.

6. The system of claim 1, wherein the first privacy router and the second privacy router are a same entity.

7. The system of claim 1, wherein at least one of the first routine client and the second routine client is a terminal device.

8. A method of executing a computing service, comprising:

coordinating, by a routine manager, the execution of a routine which forms the computing service in accordance with a respective synchronization requirement;

wherein the execution of the routine includes a process of:

performing proxy re-encryption on data from the routine, and forwarding the data from the routine; and wherein coordinating the execution of a routine includes triggering the execution of a routine, which comprises:

sending a first notification to a privacy router configured for processing the data related to routine execution, the processing comprising performing proxy re-encryption on the data by using a re-encryption key related to the receiver of the data and forwarding re-encrypted data from the routine, and forwarding a second notification to an instance of a routine server function, wherein the first notification includes: information identifying the computing service and information identifying the routine;

sending a third notification to a privacy router configured for processing the data related to routine execution, the processing comprising performing proxy re-encryption on the data by using a re-encryption key related to the receiver of the data and forwarding re-encrypted data from the routine; and forwarding a fourth notification to an instance of a routine client function, wherein the third notification includes: information identifying the computing service and information identifying the routine;

wherein at least one privacy router is further configured to initiate a communication between the instance of a routine server function and the instance of a routine client function, in accordance with communication instructions; and wherein processing the data related to routine execution is performed in accordance with communication instructions.

9. The method of claim 8, wherein the communication instructions are included in a notification to a privacy router.

10. The method of claim 8, where the re-encryption key is pre-configured in the privacy router, or is received from the routine manager as part of the communication instructions.

11. The method of claim 8, further comprising receiving, by the routine manager, from the instance of a routine server function or the instance of a routine client function, a notification that a data communication is completed.

12. The method of claim 9, wherein coordinating the execution of a routine includes:

sending, by the routine manager to a first instance of a service function, a first invitation message;

sending, by the routine manager to a second instance of a service function, a second invitation message;

receiving, by the routine manager from the first instance of a service function, a first accept message that includes security material for performing proxy re-encryption of the routine's data; and receiving, by the routine manager from the second instance of a service function, a second accept message that includes security material for performing proxy re-encryption of the routine's data;

wherein the sending of each message is facilitated with a privacy router.

13. The method of claim 12, wherein one or more of the first invitation message and the second invitation message further includes one or more of:

information identifying the computing service, information identifying a routine, information identifying a routine execution.

14. The method of claim 12, wherein sending the first or second invitation message further comprises sending an outer message that includes the invitation message and routing information related to a privacy router.

15. The method of claim 8, wherein coordinating the execution of a routine includes:

receiving a notification, by the routine manager, from a task manager having obtained information associated with a service profile of the computing service, to execute the routine;

sending an acknowledgment, from the routine manager to the task manager;

sending an invitation, from the routine manager to an instance of a routine server function, to contribute to the routine execution;

sending an invitation, from the routine manager to at least one instance of a routine client function, to contribute to at least one routine execution;

executing, by the routine manager, a routine communication procedure with each instance of a routine client function.

16. The method of claim 15, wherein coordinating the execution of a routine further includes:

executing at least one routine, by at least one routine manager including the routine manager, based on data obtained by a task manager, including data allowing the selection of the at least one routine manager; routine data associated with the at least one routine; task data associated to a task; compute plane data related to a task; and a request from a work manager, to trigger the task that includes the at least one routine.

17. The method of claim 16, wherein the work manager is selected by a service manager and operative to receive a work order from the service manager, receive work data associated with the work, receive information as to how to execute the work, and receive at least one execution condition.

18. An apparatus of executing a computing service, the apparatus comprising a processor coupled with a memory storing instructions, which, when executed by the processor, configure the apparatus to coordinate the execution of a routine that forms the computing service, in accordance with a synchronization requirement; wherein the execution of a routine includes a process of:

performing proxy re-encryption on data from the routine, and forwarding the data from the routine; and wherein coordinating the execution of a routine includes triggering the execution of a routine, which comprises: sending a first notification to a privacy router configured for processing the data related to routine execution, the processing comprising performing proxy re-encryption on the data by using a re-encryption key related to the receiver of the data and forwarding re-encrypted data from the routine, and forwarding a second notification to an instance of a routine server function, wherein the first notification includes: information identifying the computing service and information identifying the routine; sending a third notification to a privacy router configured for processing the data related to routine execution, the processing comprising performing proxy re-encryption on the data by using a re-encryption key related to the receiver of the data and forwarding re-encrypted data from the routine; and forwarding a fourth notification to an instance of a routine client function, wherein the third notification includes: information identifying the computing service and information identifying the routine; wherein at least one privacy router is further configured to initiate a communication between the instance of a routine server function and the instance of a routine client function, in accordance with communication instructions; and wherein processing the data related to routine execution is performed in accordance with communication instructions.

* * * * *